(12) United States Patent
Raphaeli et al.

(10) Patent No.: US 6,614,864 B1
(45) Date of Patent: Sep. 2, 2003

(54) APPARATUS FOR AND METHOD OF ADAPTIVE SYNCHRONIZATION IN A SPREAD SPECTRUM COMMUNICATIONS RECEIVER

(75) Inventors: Dan Raphaeli, Kfar Saba (IL); Avner Matmor, Omer (IL)

(73) Assignee: Itran Communications Ltd., Beersheva (IL)

( * ) Notice: Subject to any disclaimer, the term of this patent is extended or adjusted under 35 U.S.C. 154(b) by 0 days.

(21) Appl. No.: 09/415,723

(22) Filed: Oct. 12, 1999

(51) Int. Cl.[7] .................. H04L 25/00; H04L 25/40; H04L 7/00
(52) U.S. Cl. ..................... 375/371; 370/516
(58) Field of Search ................. 375/371, 139, 375/143, 145, 149, 152, 130, 367, 365, 366; 370/503, 515, 509, 510, 511, 512, 513, 514, 516

(56) References Cited

U.S. PATENT DOCUMENTS

| | | | |
|---|---|---|---|
| 3,934,203 A | 1/1976 | Schiff | |
| 4,301,537 A | 11/1981 | Roos | |
| 4,423,517 A | 12/1983 | Danno et al. | |
| 4,477,912 A | 10/1984 | Russell | |
| 4,567,488 A | 1/1986 | Jerrim | |
| 4,567,588 A | 1/1986 | Jerrim | 370/18 |
| 4,621,365 A | * 11/1986 | Chiu | 375/1 |
| 4,860,307 A | 8/1989 | Nakayama | |
| 4,924,188 A | 5/1990 | Akazawa et al. | |
| 4,933,953 A | 6/1990 | Yagi | |
| 5,090,024 A | 2/1992 | Vander Mey et al. | |
| 5,101,417 A | 3/1992 | Richley et al. | |
| 5,111,478 A | 5/1992 | McDonald | |
| 5,155,741 A | 10/1992 | Waters et al. | |
| 5,179,572 A | 1/1993 | Schilling | |
| 5,204,877 A | 4/1993 | Endo et al. | 375/1 |
| 5,208,830 A | 5/1993 | Cornec et al. | |
| 5,222,075 A | 6/1993 | Richley | |
| 5,237,587 A | 8/1993 | Schoolcraft | |

(List continued on next page.)

FOREIGN PATENT DOCUMENTS

| | | | |
|---|---|---|---|
| EP | 0639914 A2 | 2/1995 | H04L/27/22 |
| EP | 0762664 | 3/1997 | H04B/1/707 |
| EP | 0910174 | 4/1999 | H04B/1/707 |
| WO | 98/59446 | 12/1998 | H04B/15/00 |

*Primary Examiner*—Chi Pham
*Assistant Examiner*—Dung X Nguyen
(74) *Attorney, Agent, or Firm*—Howard Zaretsky

(57) ABSTRACT

An apparatus for and method for acquiring synchronization for use in communications systems, i.e., acquiring the presence of a packet of data and associated timing information. A sequence of symbols having known rotation and phase is transmitted to the receiver. The receiver attempts to match the received vectors in a predefined manner in order to determine whether a signal or noise is being received. CSK modulation is used for the synchronization acquisition stage and, any desired data carrying modulation may be switched to once synchronization is obtained, which may or may not be CSK. The transmitter transmits data in the form of packets to the receiver, wherein each packet is preceded by a preamble comprising a number of symbols. The length of the preamble can be any suitable number of symbols such that the receiver is able to synchronize with the transmitter. The preamble comprises a sequence of rotated or non-rotated symbols, inverted or non-inverted (or generally phase-rotated by some amount). In some embodiments, the preamble comprises a sequence of non-rotated symbols (or symbols with a constant fixed rotation) followed by one or more symbols with a known random shift, the rotation applied to each rotated symbol being independent of the rotation applied to other symbols.

41 Claims, 11 Drawing Sheets

U.S. PATENT DOCUMENTS

| | | |
|---|---|---|
| 5,253,268 A | 10/1993 | Omura et al. |
| 5,263,046 A | 11/1993 | Vander Mey |
| 5,278,862 A | 1/1994 | Vander Mey |
| 5,359,625 A | 10/1994 | Vander Mey et al. ........... 375/1 |
| 5,359,635 A | 10/1994 | Atriss et al. |
| 5,365,550 A | 11/1994 | Roberson |
| 5,574,748 A | 11/1996 | Vander Mey et al. |
| 5,671,247 A | 9/1997 | Souissi et al. |
| 5,680,414 A * | 10/1997 | Durrant et al. ............. 375/206 |
| 5,748,669 A | 5/1998 | Yada |
| 5,748,671 A | 5/1998 | Sutterlin et al. ............ 375/200 |
| 5,768,307 A | 6/1998 | Schramm et al. |
| 5,832,029 A | 11/1998 | Mimura |
| 5,878,034 A | 3/1999 | Hershey et al. |
| 5,953,368 A * | 9/1999 | Sanderford et al. ......... 375/206 |
| 6,498,822 B1 * | 12/2002 | Tanaka ....................... 375/354 |

* cited by examiner

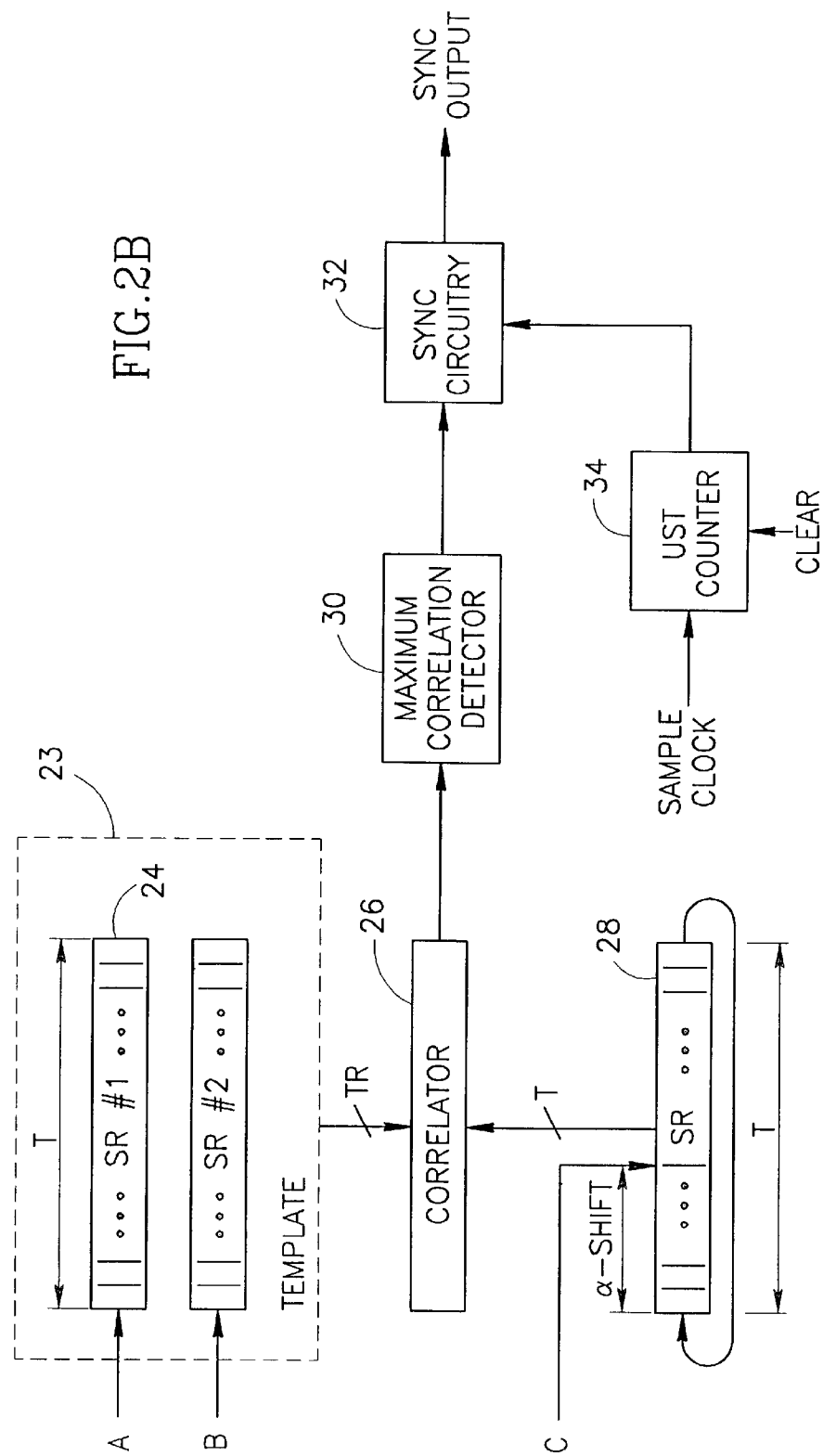

APPARATUS FOR AND METHOD OF ADAPTIVE SYNCHRONIZATION IN A SPREAD SPECTRUM COMMUNICATIONS RECEIVER

FIELD OF THE INVENTION

The present invention relates generally to data communication systems and more particularly relates to an apparatus for and method of synchronizing in a spread spectrum communication system.

BACKGROUND OF THE INVENTION

The use of spread spectrum communications techniques to improve the reliability and security of communications is well known and is becoming more and more common. Spread spectrum communications transmits data utilizing a spectrum bandwidth that is much greater than the bandwidth of the data to be transmitted. This provides for a more reliable communication in the presence of high narrowband noise, spectral distortion and pulse noise, in addition to other advantages. Spread spectrum communication systems typically utilize correlation techniques to identify an incoming received signal.

Spread spectrum communications systems are commonly used in military environments to overcome high-energy narrowband enemy jamming. In commercial or home environments it may be used to achieve reliable communication on noise media such as the AC powerline. In particular, certain home electrical appliances and devices can potentially be very disruptive of communications signals placed onto the powerline. For example, electronic dimming devices can place large amounts of noise onto the powerline since these devices typically employ triacs or silicon controlled rectifiers (SCRs) to control the AC waveform in implementing the dimming function.

A communication medium such as the AC powerline may be corrupted by fast fading, unpredictable amplitude and phase distortion and additive noise. In addition, communication channels may be subjected to unpredictable time varying jamming and narrowband interference. In order to transmit digital data over such channels it is preferable to use as wide a bandwidth as possible for transmission of the data. This can be achieved using spread spectrum techniques.

One common type of spread spectrum communications, called direct sequence spread spectrum, is generated by first modulating the digital data and then multiplying the result with a signal having a particularly desirable spectral properties, such as a Pseudo Noise (PN) sequence. The PN sequence is a periodic sequence of bits having a particular period. Each bit in the sequence is termed a chip. The sequence has the property of having very low autocorrelation for delays larger than one chip. In some systems, the PN sequence is replaced by a chirp waveform. Several techniques are available for the transmitter to modulate the data signal, including biphase shift keying also referred to as bipolar phase shift keying (BPSK) and continuous phase modulatation (CPM) techniques. Minimum shift keying (MSK) is a known variation of CPM.

The spread spectrum receiver is required to perform synchronization that is commonly implemented using an acquisition method in combination with a tracking loop or other tracking mechanism. In a noisy unpredictable environment such as the AC powerline, the tracking loop typically fails frequently causing loss of information. Communication systems to overcome these problems are large, complex and expensive. In addition, these systems typically succeed at transmitting only one or more bits per symbol.

Receiving and demodulating signals that have been subject to PN modulation requires that the same PN code sequence be generated in the receiver and correlated with the received signal to extract the data modulation. One type of correlation technique employs a digital matched filter to compare the received digital signal with the locally generated version of the PN code. The digital filter produces an in phase (I) signal and a quadrature (Q) signal from which a digital demodulator such as a DPSK demodulator can derive data values. Another function of the digital matched filter is to produce correlation measurements from which synchronization signals can be generated.

In despreading a spread spectrum signal, the receiver produces a correlation pulse in response to the received spread spectrum signal when the received spread spectrum signal matches the chip sequence to a predetermined degree. Various techniques are available for correlating the received signal with the chip sequence, including those using surface acoustic wave (SAW) correlators, tapped delay line (TDL) correlators, serial correlators, and others.

Synchronization of signals between a transmitter and receiver that are communicating with each other in a spread spectrum communication system is an important aspect of the process of transmitting signals between them. Synchronization between transmitter and receiver is necessary to allow the despreading of the received signals by a spreading code that is synchronized between them so that the originally transmitted signal can be recovered from the received signal. Synchronization is achieved when the received signal is accurately timed in both its spreading code pattern position and its rate of chip generation with respect to the receiver's spreading code.

One of the problems associated with synchronization is that the techniques used to synchronize two signals are relatively expensive to implement. In communication systems having sophisticated and relatively expensive central communication sites which serve a plurality of relatively inexpensive remote communication sites, it is desirable to reduce the cost of synchronization systems in the remote communication sites while not increasing the cost of the central communication sites.

In spread spectrum systems two general areas of uncertainty of the signal exist which must be resolved before a received spread spectrum signal can be recovered. These areas of uncertainty are spreading code phase and carrier frequency. In addition, spreading code clock rate can be a source of synchronization uncertainty. Most of this uncertainty may be eliminated by utilizing accurate frequency sources in both transmitter and receiver that are communicating with each other. However, some uncertainty cannot be eliminated by the use of accurate frequency sources, e.g., Doppler-related frequency errors.

One well-known synchronization technique involves using a sliding correlator. In the sliding correlator, a spreading code generator operates at a rate different from the rate at which a spreading code generator associated with a transmitter that transmitted the signal to be correlated operates. The effect is that the two spreading code sequences slip in phase with respect to each other, and if viewed simultaneously, the spreading codes would seem to slide past each other until the point of coincidence is reached.

More particularly, a sliding correlator receives a spread spectrum signal that is a function of a particular spreading code and generates a signal locally, which is a function of a locally-generated spreading code that is substantially similar to the particular spreading code. Subsequently, the sliding correlator compares the received signal with the locally generated signal. If the two signals are not determined to be aligned, then the sliding correlator phase shifts the local signal with respect to the received signal and loops back to compare the phase shifted local signal with the received signal. This process continues until the sliding correlator determines that the two signals are aligned at which point the total phase shift of the local signal is stored by the sliding correlator for subsequent use. The total phase shift and the locally-generated spreading code are used to despread subsequently received spread spectrum signals which have been spread with spreading codes which are substantially similar to the locally generated spreading code, but phase-shifted.

In general, prior art receivers that utilize standard synchronization techniques such as matched filter detectors or sliding matched filter detectors may not be able to receive if the channel distorts the transmitted waveform sufficiently such that the waveform at the receiver side does not match or badly matches the original sequence.

SUMMARY OF THE INVENTION

The present invention is an apparatus and method for acquiring synchronization, i.e., acquiring the presence of a packet of data and associated timing information, for use in communications systems regardless of the type of modulation used. Examples of types of applicable communications receivers include BPSK, QAM and even OFDM receivers. A typical application of the invention, however, is in spread spectrum data communications systems that utilize the Differential Code Shift Keying (DCSK) or non-differential Code Shift Keying (CSK) modulation technique. The invention is particularly useful in general in any application where (1) synchronization needs to be performed quickly; (2) the synchronizer has no (or not enough) a priori knowledge of where to expect synchronization thus preventing a tracking loop from being used and (3) there is enough distortion, linear or nonlinear, such that correlating with a known signal does not work or works poorly.

An assumption of the present invention is that the properties of a communications channel do not change that rapidly compared to the time needed to transmit a packet of data. Based on this assumption, the invention functions to transmit a sequence of symbols having known rotation and phase to the receiver. The receiver attempts to match the received vectors in a predefined manner in order to determine whether a signal or noise is being received.

Such communications systems are applicable to relatively noisy and/or distorting environments such as the AC powerline, telephone line (low quality or unmatched twisted pair), wireless (e.g., RF and IR). The present invention utilizes CSK modulation for the synch acquisition stage. Once synchronization is obtained, the modem can switch to any desired data carrying modulation, which may or may not be CSK.

In a CSK transmission system, the data is transmitted in the form of time shifts between consecutive circularly rotated waveforms of length T which are referred to as spreading waveforms. The spreading waveforms can comprise any type of waveform that has suitable auto correlation properties.

During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform (also referred to as a chirp) before it is transmitted.

In a CSK system, the data is conveyed in the absolute shift assigned to the spreading waveform. In a DCSK system, the data is conveyed in the shift differential between consecutive symbols. The synchronization scheme of the present invention is applicable to both CSK and DCSK transmission systems.

A correlator in the receiver employs a matched filter having a template of the spreading waveform pattern to detect the amount of rotation (or circular shift) within the received signal for each symbol. The received data is fed into a shift register and circularly rotated, i.e., shifted. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

Note that it is assumed that the transmitter transmits data in the form of packets to the receiver. In the present invention, each packet is preceded by a preamble comprising a number of symbols. The length of the preamble can be any suitable number of symbols such that the receiver is able to synchronize with the transmitter. The preamble comprises a sequence of rotated or non-rotated symbols, inverted or non-inverted (or generally phase-rotated by some amount). In some embodiments, the preamble comprises a sequence of non-rotated symbols (or symbols with a constant fixed rotation) followed by one or more symbols with a known random shift, the rotation applied to each rotated symbol being independent of the rotation applied to other symbols. Embodiments are described herein that utilize both types of preambles.

The present invention is first described followed by the presentation of several embodiments that illustrate the principles of the present invention. In a first embodiment, the template comprises a number of shift registers equal to the number of non-rotated symbols in the preamble. In the second and third embodiments, the template comprises a number of shift registers that is independent of the number of symbols transmitted in the preamble. Note that the preamble used in the first embodiment may have two or more rotated symbols.

In the first, second and third embodiments, the rotated symbol is detected by clocking the received signal into a shift register at a tap position located a number of taps from the first tap. The tap position corresponds with the amount of shift applied to the symbol at the transmitter. After the symbol is received and clocked for a UST period, the shift register holds a non-rotated symbol that is correlated with the contents of the template. Under normal operation, the template contains a function of the plurality of non-rotated symbols. Thus, upon receipt of the shifted symbol, the correlator generates a peak sum that is detected and synchronization is subsequently declared.

In a second embodiment, the number of template shift registers is independent of the number of symbols in the preamble and a single shifted symbol is transmitted. A third embodiment is similar to the second with the difference being two shifted symbol are transmitted. The synchronization apparatus thus comprises additional circuitry to correlator two symbols simultaneously.

In a fourth embodiment, the number of shift registers is equal to the number of symbols in the preamble. A plurality of functions processes the portions of the shift registers. The outputs of these functions are input to an accumulator. When a proper preamble sequence is received, the accumulator generates a peak and in response, a synchronization pulse is output.

There is provided in accordance with the present invention, in a communications system, a method of acquiring synchronization, comprising the steps of transmitting a preamble over a communication channel, the preamble comprising a plurality of symbols having known rotation and phase, receiving a sequence of input samples from the communication channel, dividing the received sequence into two or more vectors, de-rotating and phase correcting the vectors back to their original rotation and phase and applying a matching function between the vectors so as to generate a metric indicative of the degree of synchronization.

The symbols may comprise spreading waveforms characterized by high, sharp autocorrelation or pseudo noise sequences. The step of applying a matching function may utilize a correlator to compare the one or more vectors and a template formed from some of the vectors in a recursive fashion or a non-recursive fashion.

There is also provided in accordance with the present invention, in a communications system, a method of acquiring synchronization, comprising the steps of transmitting a preamble over a communication channel, the preamble comprising a plurality of symbols having known rotation and phase, receiving a sequence of input samples from the communication channel over a plurality of channels, each channel corresponding to a different frequency band, dividing the received sequence into two or more vectors within each channel, de-rotating and phase correcting the vectors back to their original rotation and phase, applying a matching function between the vectors so as to generate a metric for each channel indicative of the degree of synchronization and combining the metric generated for each the channel so as to produce a combined output metric indicative of the degree of synchronization for all channels.

The step of combining may comprise generating the combined output metric utilizing separate synchronization circuits, each synchronization circuit associated with a single channel, wherein the output of one of the synchronization circuits is selected according to a predetermined criterion. The step of combining may also comprise the steps of passing the output of each channel through a nonlinear function and summing the outputs of the nonlinear function for each channel.

There is further provided in accordance with the present invention, in a communications system, a method of acquiring synchronization, comprising the steps of transmitting a preamble comprising a plurality of symbols having a first rotation and phase followed by one or more rotated symbols each having a predefined rotation and phase, the preamble transmitted over a communications channel, generating a template adapted in accordance with the contents of the plurality of symbols during the reception thereof, generating vectors from a signal received from the communications channel, the vectors generated in accordance with the rotated symbols, de-rotating and phase correcting the vectors back to their original rotation and phase and matching the vectors with the template so as to generate a metric indicative of the degree of synchronization.

The step of generating vectors comprises the step of inputting the received signal into a shift register at a tap position a distance from the first tap corresponding to the amount of a second rotation. The step of matching the vectors comprises the step of correlating the contents of the template with the contents of a shift register so as to generate a correlation sum, and detecting synchronization in response to a maximum correlation sum.

There is still further provided in accordance with the present invention an apparatus for acquiring synchronization in a communications system, the communications system including a preamble consisting of a plurality of symbols having a first rotation followed by a shifted symbol having a second rotation, the preamble transmitted over a communications channel, the apparatus comprising a template including means for adapting the template to the characteristics of the communication channel during the reception of the plurality of symbols, a shift register adapted to input a received signal at a tap position a distance from the first tap corresponding to the amount of the second rotation and a correlator operative to correlate the contents of the template with the contents of the shift register so as to generate a correlation sum, synchronization being detected in response to a maximum correlation sum.

There is also provided in accordance with the present invention, in a communications system, a method of acquiring synchronization, comprising the steps of transmitting a preamble comprising a plurality of symbols having a first rotation followed by M shifted symbols, wherein each shifted symbol is shifted by an amount independent of the shifts of other symbols, the preamble transmitted over a communications channel, generating a template that is adapted to the characteristics of the communication channel during the reception of the plurality of symbols, inputting a received signal into an $I^{th}$ shift register at a tap position a distance from the first tap corresponding to the amount of rotation of the $I^{th}$ shifted symbol, correlating the contents of the template with the contents of the M shift registers so as to generate a plurality of correlations and summing the plurality of correlations to generate a correlation sum and detecting synchronization in response to a maximum correlation sum.

In addition, there is provided in accordance with the present invention an apparatus for acquiring synchronization in a communications system, the communications system including a preamble consisting of a plurality of symbols having a first rotation followed by M shifted symbols, wherein each shifted symbol is shifted by an amount independent of the shifts of other symbols, the preamble transmitted over a communications channel, the apparatus comprising a template including means for adapting the template to the characteristics of the communication channel during the reception of the plurality of symbols, M shift registers, the $I^{th}$ shift register adapted to input a received signal at a tap position a distance from the first tap corresponding to the amount of rotation of the $I^{th}$ shifted symbol, M correlators operative to correlate the contents of the template with the contents of the M shift registers so as to generate M correlation outputs and a summer for summing the M correlation outputs so as to generate a correlation sum, synchronization being detected in response to a maximum correlation sum.

There is further provided in accordance with the present invention an apparatus for acquiring synchronization in a communication system, the communication system including a preamble sequence consisting of a plurality of symbols wherein each symbol has either a zero shift or a non-zero shift rotation associated therewith, the apparatus comprising N shift registers wherein N is equal to the number of symbols in the preamble sequence, a first set of M functions wherein each function comprises N inputs, one input from each shift register, the first set of M functions for processing samples input to the left most tap of the N shift registers and for processing samples input to the tap position corresponding to those symbols having non-zero shift rotations, a second set of M functions wherein each function comprises N inputs, one input from each shift register, the second set of M functions for processing samples output from the right most tap of the N shift registers and for processing samples output from tap positions one before the tap positions corresponding to those symbols having non-zero shift rotations, an accumulator coupled to the output of each the function in the first set of M functions and the second set of M functions, wherein the output of the first set of M functions is added to the accumulator and the output of the second set of M functions is subtracted from the accumulator and maximum detector circuitry operative to declare synchronization in response to a maximum peak output of the accumulator during a symbol time period.

The function comprises summing all N inputs and squaring the result. The apparatus further comprises means for phase correcting the symbols in accordance with a phase rotation or phase inversion $d_j$ previously applied to the symbols in the preamble.

There is also provided in accordance with the present invention, in a communication system including a preamble sequence consisting of a plurality of symbols wherein each symbol has either a zero shift or a non-zero shift rotation associated therewith, a method of acquiring synchronization, the method comprising the steps of transmitting a preamble comprising a plurality of symbols, each symbol having either a zero rotation shift or a non-zero rotation shift, wherein each non-zero shifted symbol is shifted by an amount independent of the shifts of other symbols, the preamble transmitted over a communications channel, inputting a received signal into a set of N shift registers where N is equal to the number of symbols in the preamble sequence, processing selected taps of the N shift registers via a first set of M functions wherein each function comprises N inputs, one input from each shift register, the first set of M functions for processing samples input to the left most tap of the N shift registers and for processing samples input to the tap position corresponding to those symbols having non-zero shift rotations, processing selected taps of the N shift registers via a second set of M functions wherein each function comprises N inputs, one input from each shift register, the second set of M functions for processing samples output from the right most tap of the N shift registers and for processing samples output from the tap positions one before the tap positions corresponding to those symbols having non-zero shift rotations, accumulating an accumulator value by adding the output of the first set of M functions to the accumulator value and subtracting the output of the second set of M functions from the accumulator value and declaring synchronization in response to the occurrence of a maximum peak of the accumulator value during a symbol time period.

There is further provided in accordance with the present invention, in a communications system, a method of acquiring synchronization, comprising the steps of transmitting a preamble over a communication channel, the preamble comprising a plurality of symbols having known time shift and phase, receiving a sequence of input samples from the communication channel, dividing the received sequence into two or more vectors, correcting the vectors in time and phase back to their original time shift and phase and applying a matching function between the vectors so as to generate a metric indicative of the degree of synchronization.

There is also provided in accordance with the present invention, in a communications system, a method of acquiring synchronization, comprising the steps of transmitting a preamble over a communication channel, the preamble comprising a plurality of symbols having known rotation, time shift and phase, receiving a sequence of input samples from the communication channel, dividing the received sequence into two or more vectors, de-rotating, de-shifting and phase correcting the vectors back to their original rotation, time shift and phase and applying a matching function between the vectors so as to generate a metric indicative of the degree of synchronization.

BRIEF DESCRIPTION OF THE DRAWINGS

The invention is herein described, by way of example only, with reference to the accompanying drawings, wherein:

FIGS. 2A and 2B are a block diagram illustrating a first embodiment of the synchronization system of the present invention which utilizes a set of template shift registers whose contents are derived from a sliding window comprising a number of shift registers equal to the number of symbols N in the preamble;

DETAILED DESCRIPTION OF THE INVENTION

Notation Used Throughout

Figure 1:
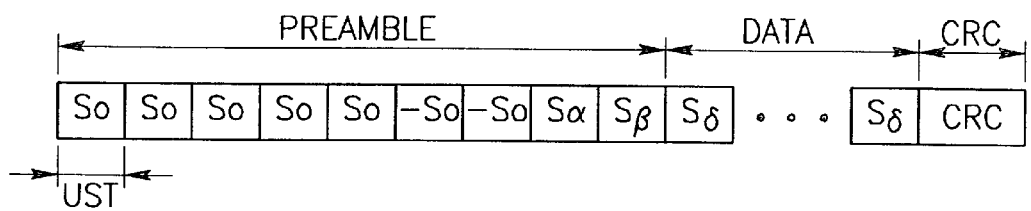
FIG. 1 is a diagram illustrating the packet structure of the data communication protocol portion of the present invention.

The following notation is used throughout this document.

| Term | Definition |
| --- | --- |
| AC | Alternating Current |
| BPSK | Bipolar Phase Shift Keying |
| CPM | Continuous Phase Modulation |
| CRC | Cyclic Redundancy Check |
| CSK | Code Shift Keying |
| DPSK | Differential Phase Shift Keying |
| DCSK | Differential Code Shift Keying |
| LSB | Least Significant Bit |
| MSB | Most Significant Bit |
| MSK | Minimum Shift Keying |
| OFDM | Orthogonal Frequency Division Multiplexing |
| PN | Pseudo Noise |
| QAM | Quadrature Amplitude Modulation |
| SAW | Surface Acoustic Wave |
| SCR | Silicon Controlled Rectifier |
| SNR | Signal to Noise Ratio |
| SR | Shift Register |
| TDL | Tapped Delay Line |
| UST | Unit Symbol Time |

Code Shift Keying (CSK)/Differential Code Shift Keying (DCSK)

The present invention is an apparatus and method for acquiring synchronization, i.e., acquiring the presence of a packet of data and associated timing information, for use in communications systems regardless of the type of modulation used. Examples of types of applicable communications receivers include BPSK, QAM and even OFDM receivers. A typical application of the invention, however, is in spread spectrum data communications systems that utilize the Differential Code Shift Keying (DCSK) or non-differential Code Shift Keying (CSK) modulation technique. The invention is particularly useful in any application where (1) synchronization needs to be performed quickly; (2) the synchronizer has no (or not enough) a priori knowledge where to expect synchronization thus preventing a tracking loop from being used and (3) there is enough distortion, linear or nonlinear, such that correlating with a known signal does not work or works poorly.

Such communications systems are applicable to relatively noisy and/or distorting environments such as the AC powerline, telephone line (low quality or unmatched twisted pair), wireless (e.g., RF and IR). The present invention utilizes CSK modulation for the synch acquisition stage. Once synchronization is obtained, the modem can switch to any desired data carrying modulation, which may or may not be CSK.

The preamble used for synchronization in the present invention is generated using CSK modulation. A more detailed description of CSK modulation can be found in "Spread Spectrum Communication System Utilizing Differential Code Shift Keying," U.S. application Ser. No. 08/879,522, filed Jun. 20, 1997, now U.S. Pat. No. 6,064,695, similarly assigned and incorporated herein by reference.

A description of CSK modulation will now be presented. Note, however, that the invention requires the use of CSK modulation during acquisition of synchronization only. Once synchronization is achieved, any type of modulation may be used to receive the data.

In a CSK transmission system, the data is transmitted in the form of time shifts between consecutive circularly rotated waveforms of length T which are referred to as spreading waveforms. The spreading waveforms can comprise any type of waveform that has suitable auto correlation properties.

During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform (before it is transmitted).

In a CSK system, the data is conveyed in the absolute shift assigned to the spreading waveform. In a DCSK system, the data is conveyed in the shift differential between consecutive symbols. A correlator in the receiver employs a matched filter having a template of the spreading waveform pattern to detect the amount of rotation (or circular shift) within the received signal for each symbol. The received data is fed into a shift register and circularly rotated, i.e., shifted. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. For DCSK, the differential shift index is then decoded to yield the originally transmitted data. The transmitter transmits data in the form of packets to the receiver. Each packet is preceded by a preamble comprising a predetermined number of symbols. The length of the preamble can be any suitable number of symbols such that the receiver is able to synchronize with the transmitter. The operating environment, i.e., channel noise, level of interference, signal to noise ratio, transmit power, receiver performance all play a factor in choosing the length of the preamble. Note, however, the invention may operate with either CSK or DCSK modulation.

As described above, the spread spectrum communication system transmits data in the form of a circularly rotated spreading waveform that is generally phase rotated by some amount. In addition, the phase rotation can be optionally inverted. The spreading waveform can comprise any type of waveform that has suitable auto correlation properties. Preferably, however, the spreading waveform comprises a filtered Pseudo Noise (PN) sequence. The PN sequence is a periodic sequence of bits having a certain period. Each bit in the sequence is termed a chip. The PN sequence has the property of having a peak autocorrelation for a delay of one chip and a very low autocorrelation for delays longer than one chip.

A diagram illustrating the packet structure of the data communication protocol portion of the present invention is shown in FIG. 1. The packet structure of the present invention comprises a preamble, an L byte data field and a Cyclic Redundancy Check (CRC) field. The preamble portion comprises a series of rotated or non-rotated, inverted or non-inverted symbols in a predefined manner, i.e., symbols generally phase rotated by some amount. For the first, second and third specific embodiments disclosed herein, the preamble comprises a sequence of non rotated symbols generally phase rotated by some amount and optionally inverted (or generally phase rotated) which are denoted by $S_0$ and are followed by a symbol $S_\alpha$ shifted by a known predetermined amount $\alpha$. Optionally, an additional symbol with a known shift may be added onto the preamble. The second symbol $S_\beta$ has a predetermined shift of $\beta$. For illustrative purposes, the description of the synchronization scheme of the present invention is described using a sequence of symbols in the preamble portion of the packet that comprises 8 or 9 symbols, i.e., seven zero shift symbols followed by one or two symbols having a known shift.

Such a preamble is illustrated in FIG. 1. Alternatively, a gap or one or more unused symbols can be placed before data symbols begin. The data symbols are denoted by $S_\delta$ where $\delta$ refers to the particular shift assigned to that symbol. Note that the preamble may have a number of symbols smaller or larger than 8 or 9 and may have symbols other than $S_0$ in the beginning.

With regard to the first, second and third embodiments, the number of symbols transmitted in the preamble having known shift, i.e., $S_\alpha$, $S_\beta$, may be larger than the examples of one or two disclosed herein. For illustration purposes only, the $S_\alpha$ and $S_\beta$ symbols have shifts of 46 and 53, respectively. Note, however, that any arbitrary shifts can be used so long as the first shift is different than the shift assigned to the $S_0$ symbol, e.g., zero shift. Note also that the $S_0$ symbol sent in the preamble may have shifts other than zero shifts, as long as the shift is consistent throughout the preamble except for the for the $S_\alpha$ and $S_\beta$ symbols.

General Description

An assumption of the present invention is that the characteristics of a communications channel change relatively little compared to the length of time needed to transmit the preamble. Based on this assumption, the invention functions to transmit a preamble comprised of a sequence of symbols having known rotation and phase to the receiver. The receiver attempts to match the received vectors in a predefined manner in order to determine whether a signal or noise is being received. One synchronization is obtained at the beginning of the packet, any suitable form of tracking means can be used to maintain synchronization for the remainder of the packet.

The receiver divides the received input vectors into two or more portions. The matching function is operative to match the multiple portions in some predefined manner to determine whether synchronization has been achieved. The result is the generation of a synchronization metric used to indicate the degree of synchronization achieved, i.e., an indication of how well the symbols received match the expected symbols in a valid preamble.

A key feature of the synchronization acquisition apparatus and method of the present invention is that the received symbols can be de-rotated and de-inverted and matched together. In the first, second and third embodiments, part of the received symbols are used to form a template while the other parts are de-rotated and correlated with the template. In other embodiments described herein the symbols are matched together in a different way. Symbols are matched together in the template. The template is also used for correlation with the received signal and is not predefined but adaptive to the channel. The template is dynamically updated by 'learning' the channel response to a predetermined training sequence, i.e., the preamble. For each packet, the preamble is used to adapt the receiver to the channel conditions.

As described previously, a preamble sequence having an length of N symbols is transmitted. The symbols $N_j$ are indexed from j=0 through N−1. Each symbol in the sequence has a length of T samples. In the examples presented herein T is equal to 64. Each symbol is rotated cyclically by the transmitter by a specific number of sample positions denoted by $\lambda_j$. Thus, the rotation of each symbol is effective to convey 6 bits of information. In addition, to the rotation, the sign $d_j$ of the symbol is used to convey an additional bit. information instead of being used for synchronization. In general $d_j$ can be complex to represent some phase rotation or scaling, if desired. The signal received by the receiver is termed X(n) and may comprise the complex samples of a single channel. The index 'i' is used to denote the first sample of the preamble sequence in X(n). In other words, 'i' is the position in the received signal stream that is currently being checked for synchronization. For each value of i, a synchronization match value is obtained.

Note that a receiver may comprise several channels, each channel occupying a different frequency band. Further, each channel may comprise separate I and Q streams (the I and Q represents the real and imaginary portions of the complex sample). If multiple channels are used in the receiver, a separate synchronization circuit as shown in the example embodiments hereinbelow is used in each individual channel. Separate channels may be used to aid in combating interference in any one particular frequency band. Each frequency may have separate I and Q channels.

The synchronization circuits presented below in the example embodiments are either of the recursive or non-recursive type. In both cases, the received inputs vectors are compared to each other according to some predefined matching function. The degree of matching indicates the degree of synchronization achieved, i.e., an indication of how well the symbols received have been detected as a valid preamble. The matching functions may be, for example, taking the average of the non-rotated symbols and comparing them to the rotated symbols. Note that the input vectors may or may not correspond with the symbols transmitted by the transmitter since the symbols have passed through the channel and may be corrupted with noise. It is the role of the synchronization circuits to attempt to detect the signal from the surrounding noise.

The receiver is operative to divide the received signal into a plurality of vectors, each vector having the length of a symbol, i.e., UST. Therefore, the following vectors described in Equation 1 below is obtained for the $j^{th}$ symbol.

$$S^{j,i} = \{X_{i+jT}, X_{i+jT+1}, \ldots, X_{i+(j+1)T-1}\} \quad (1)$$

Note that there are NT samples in the preamble and j runs from 0 through N−1. At any time 'i' the received signals is divided into vectors, each vector indexed by j=0, 1, 2, etc. Each vector is then rotated by $-\lambda_j$ in order to de-rotate the received vector that was previously rotated by the transmitter with rotation $\lambda_j$. Let us define a function q(Z,δ) which de-rotates a vector Z by δ. The de-rotation is performed in accordance with Equation 2 presented below.

$$q(Z,\delta) = \{Z_{-\delta+T}, Z_{-\delta+1+T}, \ldots, Z_{T-1}, Z_0, Z_1, \ldots, Z_{-\delta+T-1}\} \quad (2)$$

$$q(Z,\delta) = \{Z_{-\delta+T}, Z_{-\delta+1+T}, \ldots, Z_{T-1}, Z_0, Z_1, \ldots, Z_{-\delta+T-1}\} \quad (2)$$

where q defines a function operation performed on the vectors

Z is an arbitrary vector formed from the received samples

T is the number of samples in a symbol, e.g., 64

δ is the degree of shift or rotation applied to the vector

The rotated vector is then multiplied by its associated sign '$d_j$' to obtain the following vector as expressed in Equation 3 below.

$$B^{j,i} = q(S^{j,i}, \lambda_j) \cdot d_j \qquad (3)$$

where j represents the index of the symbol in the training sequence;

i indicates the point in time when synchronization was declared;

B represents the vector rotated using Equation 2 above;

S represents the vector of received samples using Equation 1;

$\lambda$ represents the shift originally applied to the symbol by the transmitter;

d represents the sign (or phase) of the symbol; Note that if $d_j$ is not +1 or −1 than the function 'q' is divided by $d_j$ instead of being multiplying by $d_j$.

At this point, there are N vectors each represented by $B^{j,i}$ with each vector associated with a single symbol and comprising T samples.

The vectors are then matched together in a way that is defined by a particular function. For each vector, the function is operative to yield a result that is termed the synchronization output $\gamma_i$. The index i is incremented until a threshold is reached. Once the threshold is reached, a maximum result for $\gamma_i$ is obtained within the next symbol width of samples. Once the maximum is found, the packet is declared to be found and the shift index corresponding to the maximum is used to initialize the receiver timing. The receiver may wait an indeterminate length of time for synchronization to be achieved. The length of time required depends on many variables including the transmitter characteristics, channel characteristics, noise and receiver characteristics.

For the general non-recursive case, the synchronization is expressed mathematically in Equation 4 presented below.

$$\gamma_i = \sum_{k=0}^{T-1} f(B_k^{0,i}, B_k^{1,i}, \ldots, B_k^{N-1,i}) \qquad (4)$$

The mathematical relation expressed in Equation 4 includes a matching function '$f$' which may be any general function, e.g., averaging, comparing, etc., that is used to determine the degree of match between the samples of the de-rotated vectors and thus whether the receiver is receiving an actual signal or just random noise. The terms 'B' represent the input vectors formed from the received signal. The vectors are used to search for synchronization and thus typically do not represent the symbols at the time synchronization initially begins. Note that the computation in Equation 4 is performed every sample time. It may, however, be performed fewer times in order to save complexity in the circuitry. In addition, each sample may comprise any number of bits.

For the general recursive case, the synchronization can be expressed mathematically in Equation 5 below.

$$\gamma_i = \sum_{k=0}^{T-1} g(Y_k^i, B_k^{0,i}, B_k^{1,i}, \ldots, B_k^{N-1,i}) \qquad (5)$$

where $\gamma_i$ is the correlation output for the $i^{th}$ position;

k is a single element from vector B;

T is the number of samples in a symbol, e.g., 64;

g( ) is a general function used for matching the template with other samples;

B represents a rotated vector;

$Y_k^i$ is the output generated by the template adaptation function and is given by Equation 6 below $$Y_k^i = h(Y_k^{i-1}, S_k^{0,i}, S_k^{1,i}, \ldots, S_k^{N-1,i}) \qquad (6)$$

where h( ) is a generalized function performed by the template adaptation function unit;

S is the symbol before rotation;

Example Embodiments

The apparatus and method of the synchronization scheme of the present invention will now be described in more detail. Five illustrative embodiments are presented as follows. The first embodiment is non-recursive and utilizes a set of template shift registers whose contents are derived from a sliding window comprising a number of shift registers equal to the number of non-rotated symbols in the preamble. The second embodiment is non-recursive and utilizes an arbitrary number of template shift registers and a preamble comprising many symbols. The preamble may only comprise a single symbol $S_\lambda$ having a non-zero rotation. A third embodiment is presented, also recursive, that utilizes an arbitrary number of template shift registers similar to the second embodiment, but uses a preamble comprising many symbols, i.e., that only comprises two symbols $S_\lambda$ $S_\beta$ having a non-zero rotation. A fourth non-recursive embodiment is presented that is operative to recognize a training preamble sequence without the use of a separate template register and correlator. A fifth embodiment is presented that comprises multiple channels, each incorporating a separate synchronization circuit.

First Embodiment: Sliding Window With N Shift Registers

Figure 2A:
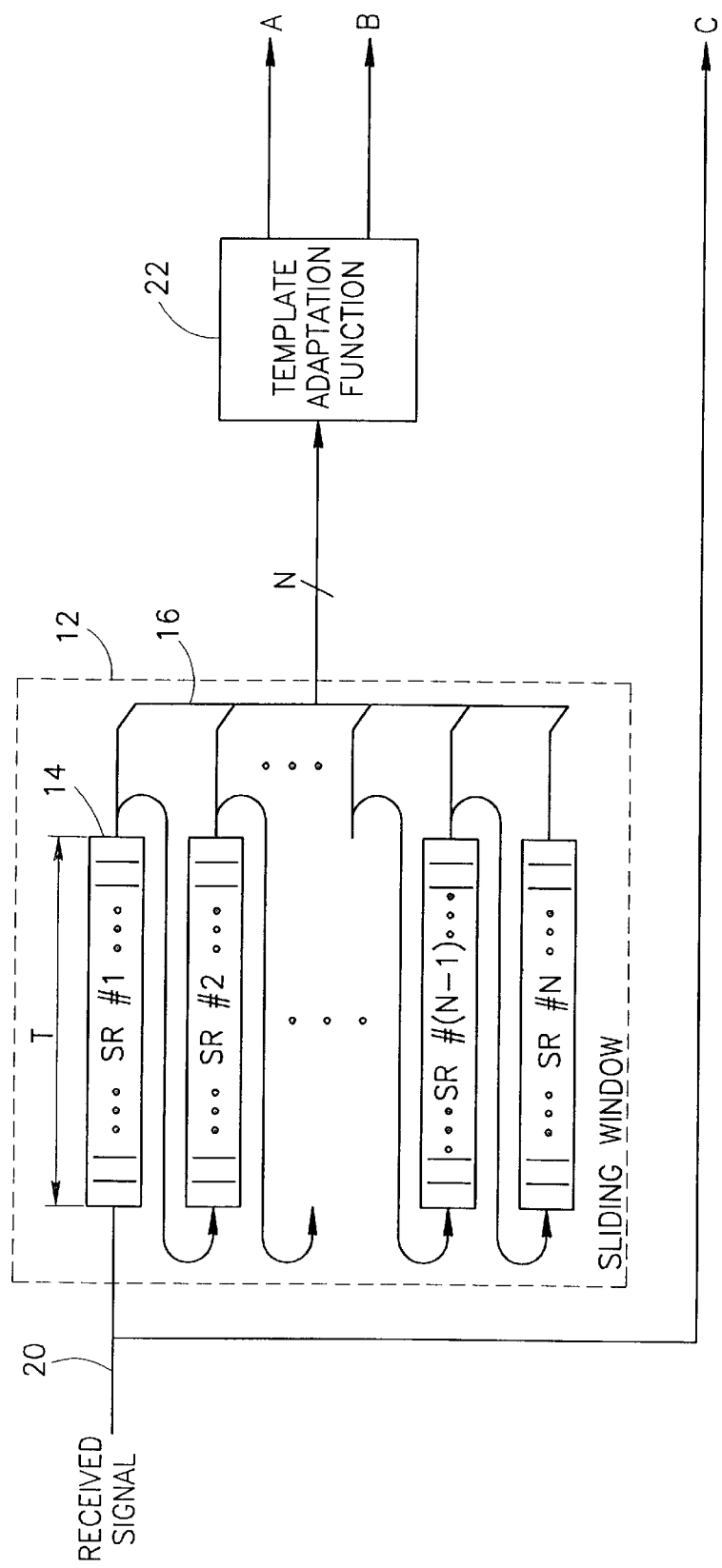

A block diagram illustrating a first embodiment of the synchronization system of the present invention which utilizes a set of template shift registers whose contents are derived from a sliding window comprising a number of shift registers equal to the number of non-rotated symbols in the preamble is shown in FIGS. 2A and 2B. The synchronization circuitry, generally referenced 10, comprises a sliding window 12, template adaptation function 22, template shift registers 23, correlator 26, shift register 28, maximum correlation detector 30, synchronization circuitry 32 and UST counter 34.

As described previously, for illustration purposes only, the length N of the training sequence, i.e., preamble, is 8 or 9 symbols. The first 7 symbols are transmitted with zero shift (rotation). The eighth symbol is assigned a shift of $\lambda_7 = \alpha$ and the optional ninth symbol is assigned a shift of $\lambda_8 = \beta$. Note that the sign $d_j$ of each symbol is determined in accordance with a short PN sequence, for example, that is not related to the symbol's PN sequence.

The template 23 comprises R shift registers 24, each shift register comprising T taps, e.g., 64 taps. Note that the template 23 is shown comprising two shift registers 24 (R=2), labeled SR #1 and SR #2. The number R of shift registers, however, can be greater or less than two. The number R of shift registers effects the resolution of the correlation process. To obtain higher resolutions, larger values of R can be used.

The received signal 20 is derived from a sampler in the receiver that is placed after the A/D converter. In this example each sample, either I or Q, comprises one bit. The received signal is input to a sliding window 12 which comprises a plurality of shift registers 14, labeled SR #1 through SR #N. In this first embodiment, the number of shift registers is equal to the number N of symbols. In the example presented herein, the number of shift registers is equal to 7 that corresponds to the number of zero shift symbols transmitted in the preamble. The shift registers 14 are arranged such that the output of SR #1 wraps around to the input of SR #2 and so on through SR #N. The received signal is input to SR #1. The output of shift registers #1 through #N form a bus 16 having N samples.

Each least significant bit (LSB) of each shift register 14 is input to the template adaptation function 22 via the bus 16. Note that each shift register in the sliding window represents a UST delay. The UST delay of SR #1 functions to prevent the eighth symbol $S_\alpha$ from entering the template adaptation function 22. The template adaptation function 22 is operative to invert the samples according to $d_j$, sum the seven input bits and quantize the result so as to yield an average represented in two bits. Note that the template adaptation function can optionally be adapted to generate any number of output bits greater than or less than 2. In addition, the function performed on the input bits may be functions other than the average. Further, the sliding window may comprise a number of shift registers larger than or less than 7 and the input samples may comprise any number of bits.

To aid in understanding the principles of the present invention, the equivalent mathematical function $f$ is shown below in accordance with Equation 4 described above.

$$f(B_k^{0,i}, B_k^{1,i}, \ldots, B_k^{7,i}) = (B_k^{0,i} + B_k^{1,i} + B_k^{2,i} + B_k^{3,i} + B_k^{4,i} + B_k^{5,i} + B_k^{6,i}) \cdot (B_k^{7,i}) \quad (7)$$

Where $B_k^{7,i}$ represents the rotated symbol ($S_\alpha$). The function $f$ is the same as that shown in Equation 4 above. For the case of a preamble having seven non-rotated symbols following by two rotated symbols ($S_\alpha$ and $S_\beta$), the function is expressed as follows in Equation 8 below.

$$f(B_k^{0,i}, B_k^{1,i}, \ldots, B_k^{8,i}) = (B_k^{0,i} + B_k^{1,i} + B_k^{2,i} + B_k^{3,i} + B_k^{4,i} + B_k^{5,i} + B_k^{6,i}) \cdot (B_k^{7,i} + B_k^{8,i}) \quad (8)$$

Where $B_k^{7,i}$ and $B_k^{8,i}$ represent the rotated symbols $S_\alpha$ and $S_\beta$, respectively.

The output of the template adaptation function 22 is input to shift registers 24, labeled SR #1 and SR #2, within template 23. Note that alternatively, a single shift register may be used wherein each tap comprises two bits.

The output of the sampler is also input to a shift register 28 in addition to the sliding window 12. The shift register 28 is configured as a circular shift register wherein the least significant bit (LSB) is input fed back to the nost significant bit (MSB) in circular fashion. The input bits are input into the circular shift register at a tap point shifted by a from the first tap. The α shift is the shift assigned to the first non zero shifted symbol transmitted in the preamble. It is the symbol denoted by $S_\alpha$ and in this example is the eighth symbol in the preamble having a shift value of 46 out of 64.

The bits input to the shift register 28 are circularly shifted whereby the output bits wrap around to the input of the shift register. Note that in shifting the contents of the register, bits are not shifted past the input tap that is located α taps from the first tap, but thrown away. The eighth symbol contains the α shifted symbol.

For each sample, i.e., bit, position, the shift register 28 is correlated with the contents of the template shift register 23 (2 bits per tap in this example). Note that TR bits from the template and T bits from shift register 28 are input to the correlator where T is the number of samples per symbol, e.g., 64 and R is the number of bits per tap within the template 23, e.g., 2. The output of the correlator is input to a maximum correlation detector 30 that functions to determine the maximum value output of the correlator over a period of time. The correlator is used to generate an output every sample time. Note that in connection with the correlator, each R bits represent one signed integer.

The output of the maximum correlation detector is input to the synchronization circuitry 32. The synchronization circuitry 32 also receives the output of a UST counter 34. The UST counter is adapted to output a pulse after a UST time. It receives the sample clock as input in addition to a clear signal. The synchronization circuitry looks at the output of the maximum correlation detector and if a new maximum is detected, the UST counter 34 is cleared and the counter starts counting one UST time. Once a UST time has elapsed, a synchronization pulse is generated indicating that synchronization has been achieved. The result is a synchronization pulse generated exactly one UST from the detection of the last maximum. Note that the search for a maximum correlation is initiated only after a predefined threshold is exceeded.

Figure 3:
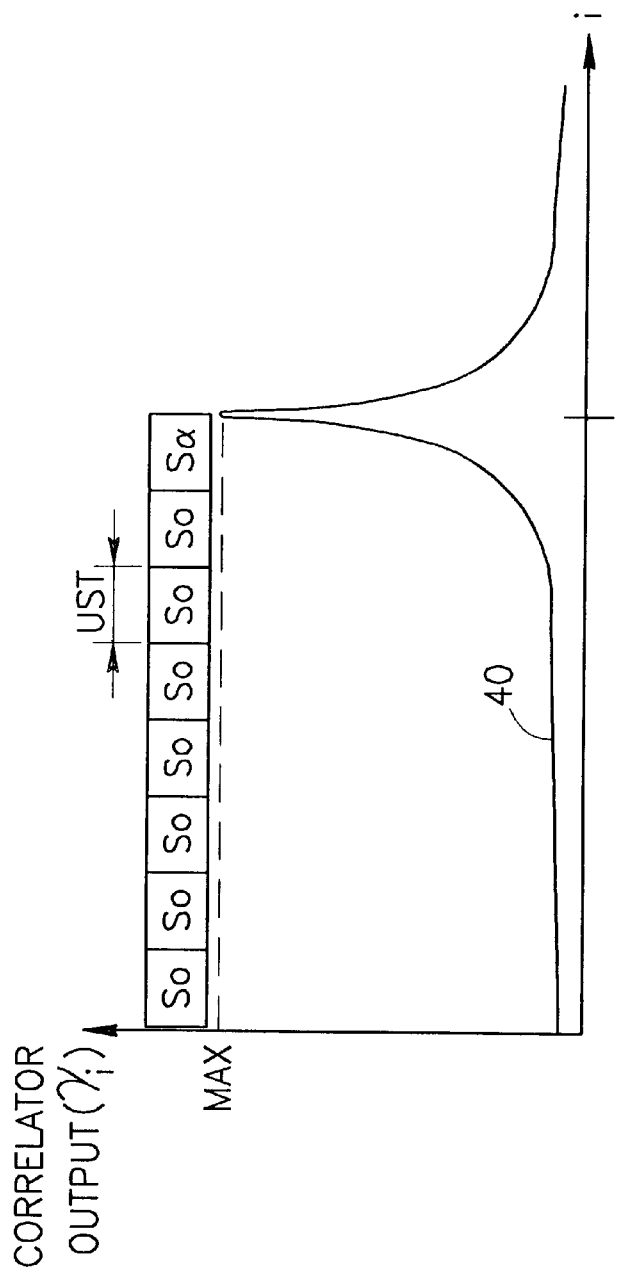
FIG. 3 is a graph illustrating the synchronization output signal as a result of correlation between the received signal and the contents of the template registers.

A graph illustrating the synchronization output signal as a result of correlation between the received signal and the contents of the template registers is shown in FIG. 3. The curve 40 indicates the expected correlation results obtained in response to receipt of a preamble. The seven consecutive non-rotated symbols are followed by a symbol rotated by α. When the α symbol is input to the shift register 28, it is circularly shifted such that after a UST time delay, the symbol in the shift register 28 is a non-rotated symbol. This is because the shift given to the symbol when transmitted is compensated for by inputting the received input bits to the shift regsiter 28 at a point shifted by α taps from the first tap.

At this point, the template 23 comprises an average of the last seven symbols that are unrotated preamble symbols. The correlator, in response thereto, generates a peak correlation sum since both the shift register 28 and the template 23 both contain a non-rotated symbol and thus match. Note that the first seven non-rotated symbols do not generate a correlation peak since the received bits are input to the shift register 28 shifted by a from the first tap, thus causing a mismatch between them.

Once the synchronization acquisition phase is complete data can begin to be received. For a receiver using CSK with an adaptive template, it is preferable to use the contents of the template generated during the synchronization acquisition phase during the data reception phase for one of the inputs to the correlator. This can be achieved by providing means to store the results of the template just before the α symbol $S_\alpha$ is received. The template is stored at the moment a maximum correlation is achieved, i.e., when the $S_\alpha$ symbol is completely inside shift register 28.

A key advantage of the present invention is that the template is not redefined for all conditions, but rather it is adaptive to the channel. The template is learned from the channel's response to the training sequence sent in the preamble. This has the advantage that even in very noisy and/or distorting environments, i.e., channels, correct detection and decoding of the received data is still possible due to the fact that the template has been adapted to the channel. In this fashion, the template contains data that has been transmitted through the channel and incorporates any noise, impairments, etc. that are characteristic of the channel. The template thus differs from one channel to another and potentially from one packet to another. Thus, the invention is adapted to ignore the differences in channel noise levels and frequency responses among different channels and within the same channel at different times.

Note that the template is calculated by averaging the preamble symbols as output of the sliding window. Averaging the preamble symbols serves to greatly improve the SNR. Note, however, although the template function may comprise operations other than averaging, it is preferable that some form of averaging be performed on the template data. The sliding window may comprise less than the number of rotated symbols in the preamble, although this results in less efficient averaging. Taking a number greater than the number of non-rotated symbols, however, would likely result in added noise and other negative effects to the resulting average.

Note that in this first embodiment, the number of shift registers in the sliding window is dependent on the number of non-rotated symbols in the preamble. As the number of symbols in the preamble increases so does the number of shift registers required in the sliding window.

Synchronization Method

Figure 4:
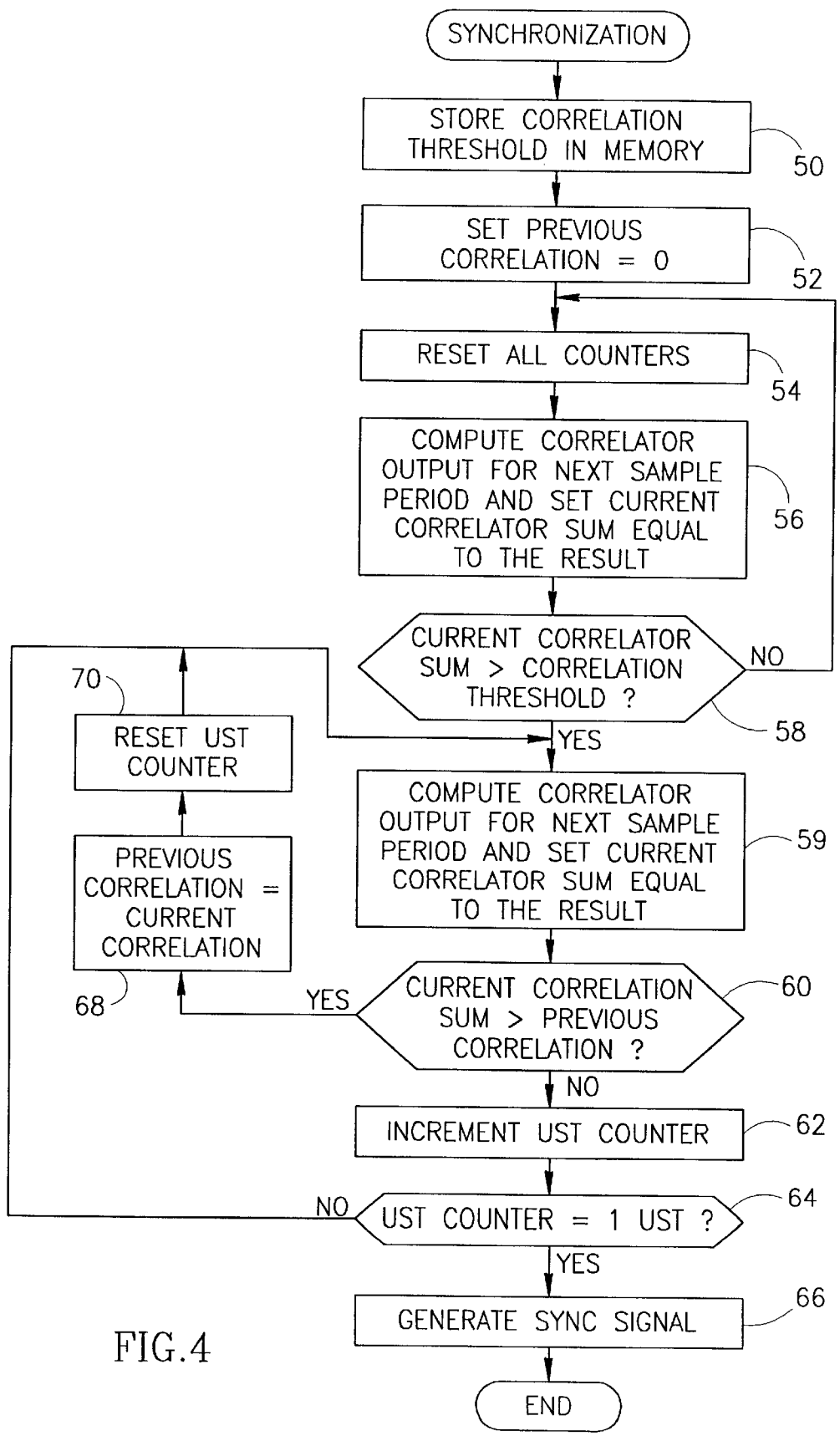
FIG. 4 is a flow diagram illustrating the synchronization method suitable for use within the maximum correlation detector portion of the present invention.

The synchronization method of the present invention will now be described in more detail. A flow diagram illustrating the synchronization method suitable for use within the maximum correlation detector portion of the present invention is shown in FIG. 4. The method described herein is suitable for use with not only the first embodiment but for the second and third embodiments describe hereinbelow.

The synchronization method described herein is performed by the maximum correlation detector. The first step is to store the correlation threshold in memory (step 50). The correlation threshold is suitably set to prevent false determination of synchronization. The previous correlation is then initialized to zero (step 52). During operation, the previous correlation is a value normally stored in memory indicating a past correlation result. All internal counters are then reset (step 54).

The correlation sum output for the next sample period is computed and the current correlation sum is set equal to the resulting correlation sum (step 56). Note that one correlation output sum is computed per sample. The current correlator sum is compared to the correlation threshold (step 58). If it is smaller than or equal to the threshold, the method continues with step 54 and the counter are reset and another correlation output sum is computed.

Once the correlation sum exceeds the threshold, a loop is entered which determines the maximum correlation sum within the next UST symbol period. At the end of the UST period the previous correlation value holds the maximum sum found and a synchronization signal is generated. In particular, if the current correlation sum is greater than the correlation threshold, then the correlation sum output for the next sample period is computed and the current correlation sum is set equal to the resulting correlation sum (step 59). It is then determined whether the current correlation sum is greater than the previous correlation (step 60).

If it is, the previous correlation is set to value of the current correlation (step 68), i.e., a new peak (maximum) has been found. The UST counter is reset (step 70) and the method returns to step 59.

If the current correlation sum is not greater than the previous correlation, the UST counter is incremented (step 62). If the UST counter has not yet reached one UST time (step 64), the method continues with step 59. If it has reached one UST time, a synchronization signal is generated to indicate that synchronization has been achieved (step 66). This point in time corresponds to one UST after the peak.

Note that the UST counter is continuously clocked by a free running clock. During normal operation, the correlation sum is not likely to be greater than the threshold until the eighth symbol, i.e., the $\alpha$ symbol $S_\alpha$. Once the symbol $S_\alpha$ is clocked into the shift register and input to the correlator, the correlation sum is expected to exceed the threshold and subsequently come to a peak. After a UST time period, a synchronization signal is generated. Note that normally, a synchronization signal is generated once in response to each preamble transmitted with each packet.

Second Embodiment: Template With Arbitrary Number Of Shift Registers (Single Rotated Symbol)

In the second embodiment, the template is comprised of an arbitrary number of shift registers unrelated to the number of symbols N in the preamble. This embodiment utilizes feedback and the autoregressive method to achieve synchronization with the transmitter.

Figure 5:
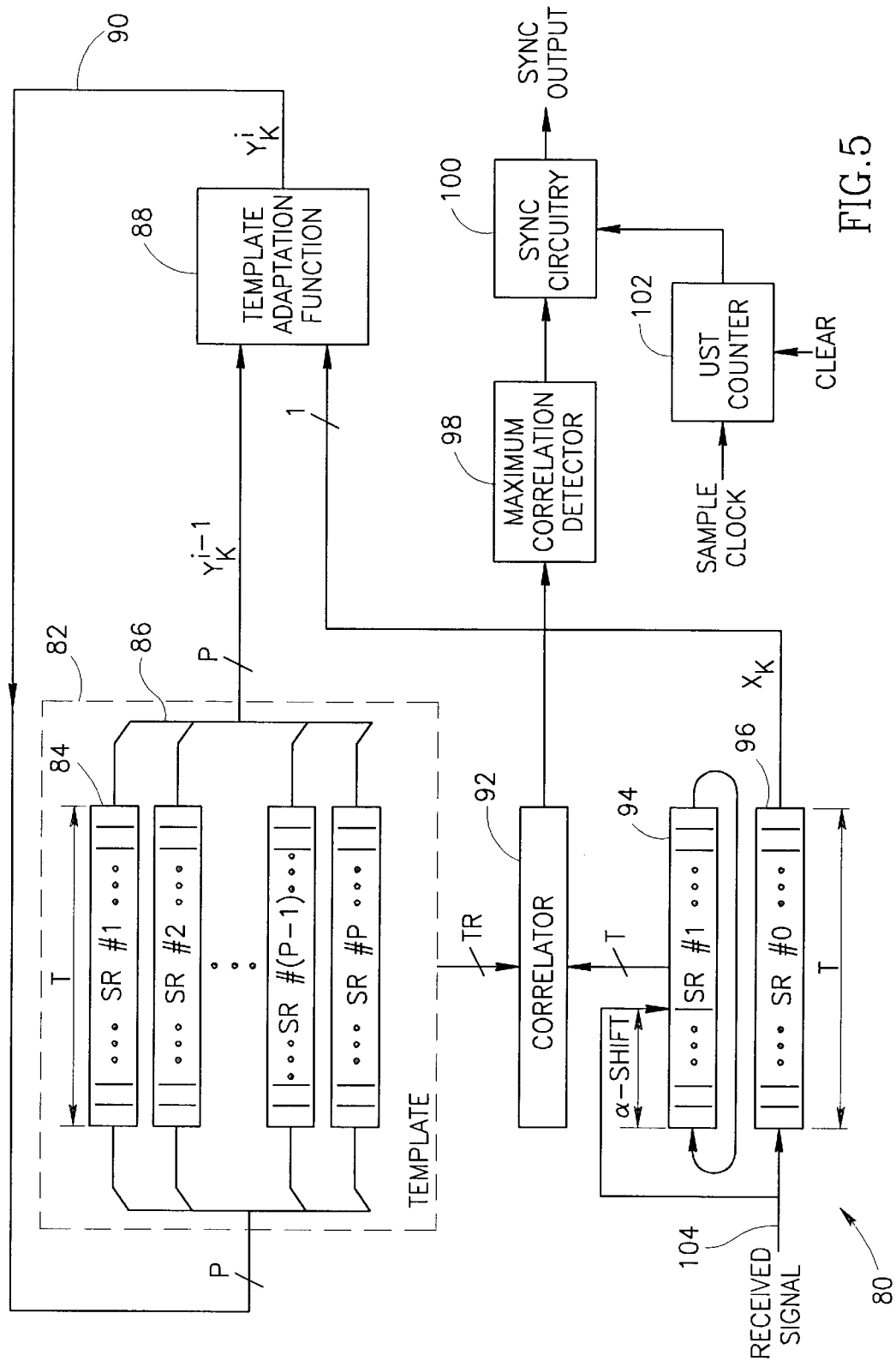
FIG. 5 is a block diagram illustrating a second embodiment of the synchronization system of the present invention wherein the number of template shift registers is independent of the number of symbols transmitted in the preamble.

A block diagram illustrating a second embodiment of the synchronization system of the present invention wherein the number of template shift registers is independent of the number of symbols transmitted in the preamble is shown in FIG. 5. The synchronization apparatus, generally referenced 80, comprises a template 82, template adaptation function 88, correlator 92, shift registers 94, 96, maximum correlation detector 98, synchronization circuitry 100 and UST counter 102.

Equations 7 and 8 can be modified in accordance with the specific embodiment disclosed herein. Thus, for the second embodiment, the synchronization can be expressed mathematically in Equation 9 below.

$$\gamma_i = \sum_{k=0}^{T-1} Y_k^i \cdot B_k^i \qquad (9)$$

where

T is the number of samples in a symbol, e.g., 64;

$B_k^i$ represents a rotated vector;

$Y_k^i$ is the output generated by the template adaptation function and is given by Equation 10 below $$Y_k^i = \begin{cases} Y_k^{i-1} \cdot c_1 + X_k \cdot c_2, & \text{for } k = i \bmod T \\ Y_k^{i-1}, & \text{for } k \neq i \bmod T \end{cases} \qquad (10)$$

where $c_1$ and $c_2$ are coefficients;

$X_k$ is the output of the shift register 96 that forms one input to the template adaptation function;

The mathematical relation expressed in Equation 10 indicates that only one sample of the template is updated for each upcoming update bit. The samples remaining in the template at that point in time remain unchanged. Note also that $c_1$ and $c_2$ can optionally be chosen such that $c_1 > c_2$ thereby giving more weight to the output of the template i.e., previous samples, than to the one currently being received. The result of the calculation in Equation 10 may optionally be limited in order to maintain the values within a specified range This provides a weighted average that yields more stability since the average of all the symbols in the template are used. Note also that when using the implementation of the second embodiment as expressed in Equations 9 and 10, the signs of all preamble symbols must be identical.

With reference to FIG. 5, the template 82 comprises a plurality of shift registers 84, labeled SR #1 through SR #P, with P representing an arbitrary number unrelated to the number of symbols N in the preamble. The width, i.e., number of taps, of each shift register is T, the number of samples in a symbol, e.g., 64. The value of P does influence the resolution of the system, thus to achieve higher resolutions, larger values of P should be used. The single bit outputs of the P shift registers 84 form a bus 86 that forms the input denoted $Y_k^{i-1}$ to the template adaptation function 88.

Note that the initial value of the contents of the template shift registers is a don't care. Optionally, during the power up sequence, the template shift registers can be clocked T (64) times to obtain an initial condition. The data clocked in corresponds to the signal received from the channel.

Alternatively, the shift registers 84 may comprise a single shift register having T taps corresponding to the length of the symbol and wherein each tap comprises P bits to improve the resolution of the synchronization process. In the example presented herein, T is equal to 64 and P is equal to 5. The value of 5 for P represents a compromise between the size of the template and the resolution desired form the synchronization process.

The received signal 104 is input to shift register #0 96 which has a length T. The output of shift register #0, denoted by $X_k$, forms one of the two inputs to the template adaptation function 88. The template adaptation function 88 is operative to calculate an output in accordance with the function expressed in Equation 10 above. The P bits output from the template form the other input to the function 88. The P bit output $Y_k^i$ 90 of the template adaptation function 88 is fed back to the input of the template 82 where it is clocked into the shift registers 84.

In this fashion, the contents of the template 82 are updated so as to track the channel characteristics. The function performed by the template adaptation function is operative to improve the SNR since the channel is learned over a period of time equal to the seven non-rotated symbols transmitted during the preamble.

The received signal 104 is input to shift register #1 94 in addition to shift register #0 96. The length of the shift register #1 is also equal to T. The signal, however, is input to SR #1 at a tap that is shifted a distance of a taps with reference to the first tap, in similar fashion to the signal input to the shift register 28 (FIGS. 2A and 2B). The output of shift register #1 94 is fed back to its serial input. Note that similar to shift register 28 (FIGS. 2A and 2B), the bits shifted in shift register #1 94 are not shifted past the α tap position.

The T wide contents of shift register #1 are input to the correlator 92 in parallel. The other input to the correlator is the parallel output of the template 82. To improve resolution, an arbitrary number R of bits from each tap of the template can be input to the correlator. To reduce complexity, however, a number R of bits smaller than P from each tap is input to the correlator. In the example presented herein, R is equal to 2 that represents a compromise between correlator complexity and desired resolution.

The correlator functions to correlate, i.e., perform a matched filtering operation, the TR bits of the template and the T bits from the shift register #1 94. A correlation result is calculated once for each sample period. The output of the correlator is input to the maximum correlation detector 98 that functions to determine the maximum value output of the correlator over a period of time. The correlator is adapted to generate an output every sample time.

The output of the maximum correlation detector 98 is input to the synchronization circuitry 100. The synchronization circuitry 100 also receives the output of a UST counter 102. The UST counter is adapted to output a pulse every UST. It receives the sample clock as input in addition to a clear signal. In accordance with the output of the UST counter, the synchronization circuitry only looks at the output of the maximum correlation detector in accordance with the synchronization algorithm described hereinabove.

A graph in FIG. 3, described hereinabove, illustrates the synchronization output signal as a result of correlation between the received signal and the contents of the template registers. The curve 40 indicates the expected correlation results obtained in response to receipt of a preamble.

No correlation peak is generated from the seven non-rotated symbols since the received signal is clocked into the shift register #1 94 at a tap position that compensates for the α shift given to the symbol at the transmitter. When the α symbol $S_\alpha$ arrives, however, a correlation peak is generated.

In the preamble, seven consecutive non-rotated symbols are followed by a symbol rotated by α. When the α symbol is input to the shift register #1 94, it is circularly shifted such that after a UST time delay, the symbol in the shift register #1 94 is a non-rotated symbol. This is because the shift given to the symbol when transmitted is compensated for by inputing the received input bits to the shift regsiter at a point shifted by α taps from the first tap.

At this point, the contents of the template 82 have been adapted to the channel for the previous seven unrotated symbol periods. The correlator, in response thereto, generates a peak correlation sum since both the shift register #1 94 and the contents of the template 82 both contain a non-rotated symbol and thus match. Note that the first seven non-rotated symbols do not generate a correlation peak since the received bits are input to the shift register #1 94 shifted by a from the first tap, thus causing a mismatch between them.

Once the synchronization acquisition phase is complete data can begin to be received. Note that in operation it is preferable to use the contents of the template generated during the synchronization acquisition phase during the data reception phase for one of the inputs to the correlator. This can be achieved by providing means to store the results of the template just before the α symbol $S_\alpha$ is received. The template is stored or frozen just after the seventh non-rotated symbol is received but before the $S_\alpha$ symbol. This preserves the contents of the template after the reception of seven non-rotated symbols.

A key advantage of the present invention is that the template is not redefined for all conditions, but rather it is adaptive to the channel. The template is learned from the channel's response to the training sequence sent in the preamble. This has the advantage that even in very noisy environments, i.e., noisy channels, correct detection and decoding of the received data is still possible due to the fact that the template has been adapted to the channel. In this fashion, the template contains data that has been transmitted through the channel and incorporates any noise, impairments, etc. that are characteristic of the channel. The template thus differs from one channel to another any potentially from one packet to another. Thus, the invention is adapted to sense the differences in channel noise levels and frequency responses among different channels and within the same channel at different times.

The synchronization method performed by the maximum correlation detector 98 is the same as that described in the flow diagram illustrated in FIG. 4, described in more detail hereinabove and will thus not be repeated.

Third Embodiment: Template With Arbitrary Number Of Shift Registers (Two Rotated Symbols)

The third embodiment of the present invention is similar in operation to the second herein the template comprises an arbitrary number N of shift registers. The third embodiment also utilizes feedback and the autoregressive method to achieve synchronization with the transmitter. The difference, however, is that in the third embodiment, two rotated symbols are transmitted in the preamble rather than one as in the second embodiment. Thus, in the example described herein, a total of nine symbols are transmitted in the preamble.

Figure 6:
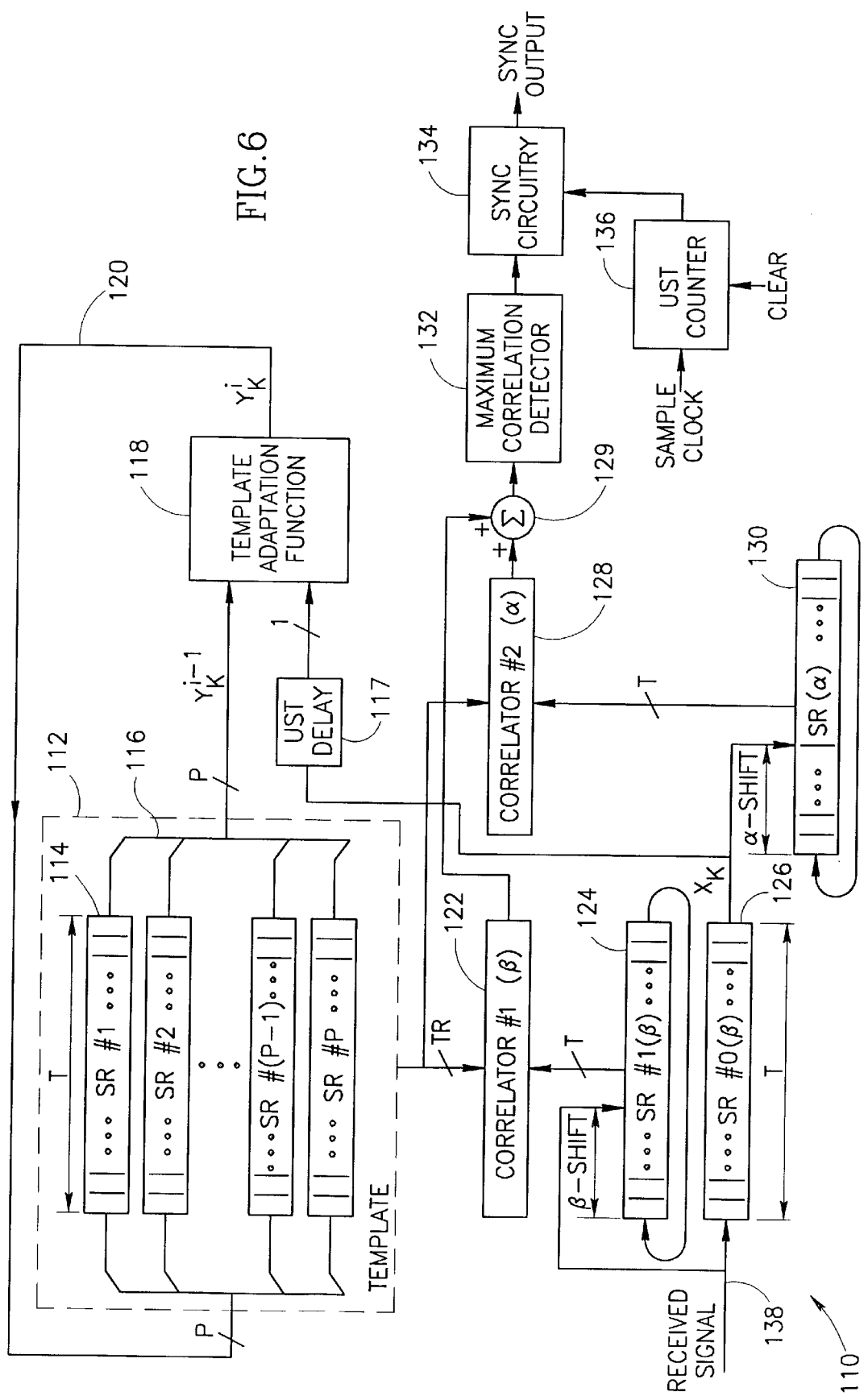
FIG. 6 is a block diagram illustrating a third embodiment of the synchronization system of the present invention wherein the number of template shift registers is independent of the number, of symbols transmitted in the preamble and two shift symbols are transmitted.

A block diagram illustrating a third embodiment of the synchronization system of the present invention wherein the number of template shift registers is independent of the number of symbols transmitted in the preamble and two shifted symbols are transmitted is shown in FIG. 6. The synchronization apparatus, generally referenced 110, comprises a template 112, template adaptation function 118, two correlators 122, 128, shift registers 124, 126, 130, summer 129, maximum correlation detector 132, synchronization circuitry 134 and UST counter 136.

The second rotated symbol added at the end of the preamble functions to improve the reliability of the synchronization process. The first rotated symbol (transmitted after the sequence of non-rotated symbols) is transmitted with a shift equal to α, e.g., 46, while the second rotated symbol is transmitted with a shift equal to β, e.g., 53.

The template 112 comprises P shift registers 114, labeled SR #1 through SR #P where P is an arbitrary number independent of the number of symbols N in the preamble. The output bit of each shift register is input to the template adaptation function 118 via bus 116. The second input to the template adaptation function 118 comprises the output of the SR #0 126. The P bit output 120 of the template adaptation function is fed back to the input of the template shift registers 114.

The received signal 138 is input to SR #0 126 and SR #1 124. The received signal is input to the serial input of SR#0 and to SR #1 at a tap that is shifted β taps from the first tap. The serial output of SR# 1124 is wrapped around to the serial input. As SR #1 is shifted, bits are not shifted past the β tap.

The serial output $X_k$ of SR #0 126 is fed into SR(α) 130 and to UST delay 117. The output of the UST delay 117 is input to one of the two inputs of the template adaptation function 118. Note that $X_k$ is delayed by a UST 117 in order that the template will not average the α shifted symbol when the β symbol arrives. Since the α shifted symbol is transmitted earlier in time than the β shifted symbol, the received signal is clocked into the β shift regsiter SR #0 126 while its serial output is input to the α shift register 130 at a tap point shifted by α taps from the first tap. The serial output of SR 130 is wrapped around to its serial input.

The synchronization apparatus 110, comprises two correlators: correlator #1 122 for detecting the β shifted symbol in the preamble and correlator #2 128 for detecting the α shifted symbol. In operation, the parallel contents of a number R of shift registers in the template are input to both correlators #1 and #2 simultaneously. The second input of the α symbol correlator #1 122 comprises the T bit wide parallel output of SR #1 124. The second input of the β symbol correlator #2 128 comprises the T bit wide parallel output of SR 130.

Each correlator functions similarly to that of correlator 92 described in connection with the second embodiment illustrated in FIG. 5. The outputs of both correlators #1 and #2 are summed by summer 129 before being input to the maximum correlation detector 132. The maximum correlation detector 132 functions to determine the maximum value of the sum of the correlators #1 and #2 over a period of time. Both correlators #1 and #2 are used to generate an output every sample time.

The output of the maximum correlation detector 132 is input to the synchronization circuitry 134. The synchronization circuitry 134 also receives the output of a UST counter 136. The UST counter is adapted to output a pulse after a UST time. It receives the sample clock as input in addition to a clear signal. The synchronization circuitry looks at the output of the maximum correlation detector and if a new maximum is detected, the UST counter 136 is cleared. Once a UST time has elapsed, a synchronization pulse is generated indicating that synchronization has been achieved. The synchronization pulse is generated exactly one UST from the detection of the last maximum. Note that the search for a maximum correlation is initiated only after a predefined threshold is exceeded.

Figure 7:
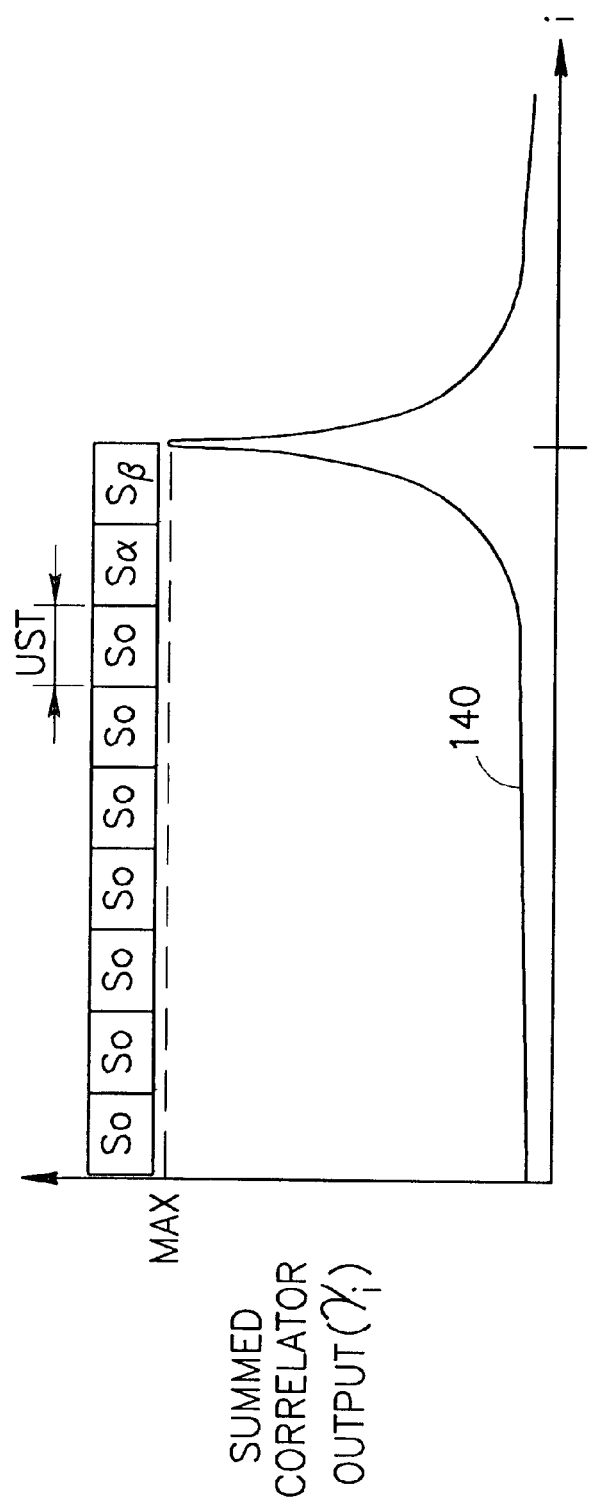
FIG. 7 is a graph illustrating the synchronization output signal as a result of correlation between the received signal and the contents of the template registers.

A graph illustrating the synchronization output signal as a result of correlation between the received signal and the contents of the template registers is shown in FIG. 7. The curve 140 indicates the expected correlation results obtained in response to receipt of a preamble having two rotated symbols. The seven consecutive non-rotated symbols are followed by a symbol rotated by α and a symbol rotated by β. When the α and β symbols are input to SR #1 124, SR 130, respectively, they are circularly shifted such that after a UST time delay, the symbol in SR #1 124 and SR 130 are non-rotated symbols. This is because the shift given to the symbols when transmitted is compensated for by inputting the received input bits to SR #1 124 and SR 130 at a point shifted by α and β taps, respectively, from the first tap.

At this point, the template 1 12 comprises an average of the last seven symbols that are unrotated preamble symbols. Correlators #1 and #2, in response thereto, generate a peak correlation sum via summer 129 since both SR #1 124 and SR 130 and the template 112 both contain a non-rotated symbol and thus match. Note that the first seven non-rotated symbols do not generate a correlation peak since the received bits are input to SR #1 124 and SR 130 shifted by α and β taps, respectively, from the first tap, thus causing a mismatch between them.

Once the synchronization acquisition phase is complete data can begin to be received. For a receiver using CSK with an adaptive template, it is preferable to use the contents of the template generated during the synchronization acquisition phase during the data reception phase for one of the inputs to correlators #1, #2. This can be achieved by providing means to store the results of the template at the moment a maximum correlation is achieved.

It is important to note that the second and third embodiments are applicable only if the non-rotated symbols transmitted are the same sign having a shift of zero or a known fixed shift other than zero. The number of non-rotated symbols N is independent of the number of shift registers in the template and may vary from packet to packet. In addition, the number of rotated symbols, e.g., $S_\alpha$, $S_\beta$, transmitted in the preamble may be any number. The synchronization apparatus, however, must be adapted to detect the number of rotated symbols transmitted in the preamble. Additional circuitry, including correlators and shift registers, must be added to detect and decode all the rotated symbols transmitted in the preamble.

Note further that when long preamble sequences are used, the synchronization apparatus of the second and third embodiments provide better performance than that of the first embodiment when cost is also considered. Long preamble sequences are preferably used, for example, to overcome very noisy channels having very low SNR. This is because the synchronization apparatus of the second and third embodiments has a limited, predefined number of shift registers whereas in the synchronization apparatus of the first embodiment the number of shift registers in the template corresponds to the number of symbols in the preamble.

On the other hand, when a short preamble is used, the synchronization apparatus of the first embodiment has an advantage of that of the second and third embodiments. This is due to the fact that all the preamble symbols are averaged equally of time whereas the template adaptation function gives more weight to the current symbol of the preamble as opposed to previous symbols. Thus, for example, if the current symbol contains a large amount of noise with reference to previous symbols, it is reflected more strongly in the final contents of the template.

Fourth Embodiment: Number of Shift Registers Equal to Number of Symbols in Preamble Sequence The fourth embodiment of the present invention is operative to recognize a training preamble sequence without the use of a separate template register and correlator. The received data is shifted into a group of shift registers whose number equals the number of symbols in the preamble sequence. The shift registers are arranged in daisy chain fashion with the serial output of the first shift register input to the serial input of the second shift register.

The preamble sequence preferably contains one or more symbols having zero rotation and one or more symbols having some fixed predefined rotation. There is no requirement as to the number of symbols in the preamble nor to the number of symbols having a fixed rotation. In the event the preamble contains more than one symbol with a fixed rotation, the rotation of each rotated symbol is independent of the other rotated symbols. Further, the degree of rotation applied to each non-zero rotated symbol is not critical to operation of the invention.

A key principle of the fourth embodiment of the present invention is that the preamble symbols, after being clocked into shift registers, are input to a plurality of functions which are operative to calculate a value based on the contents of the shift registers. A plurality of taps are selected for input to these functions whereby the output of each function is input to an accumulator. Half of the function outputs are added to the accumulator and half are subtracted from the accumulator. The output of the accumulator represents the degree of synchronization at any point in time. When a peak in the accumulator output is detected, synchronization is declared.

An example of a synchronization apparatus suitable for use with a preamble comprising three symbols will now be presented for illustrative purposes as an aid in understanding the principles of the present invention. Note, however, that the invention is not limited by the number of symbols in the preamble, as the invention can be adapted to handle any number of total symbols and any number of non-zero rotated symbols. The rotation of each non-zero rotated symbol can be any number other than zero.

Figure 8A:
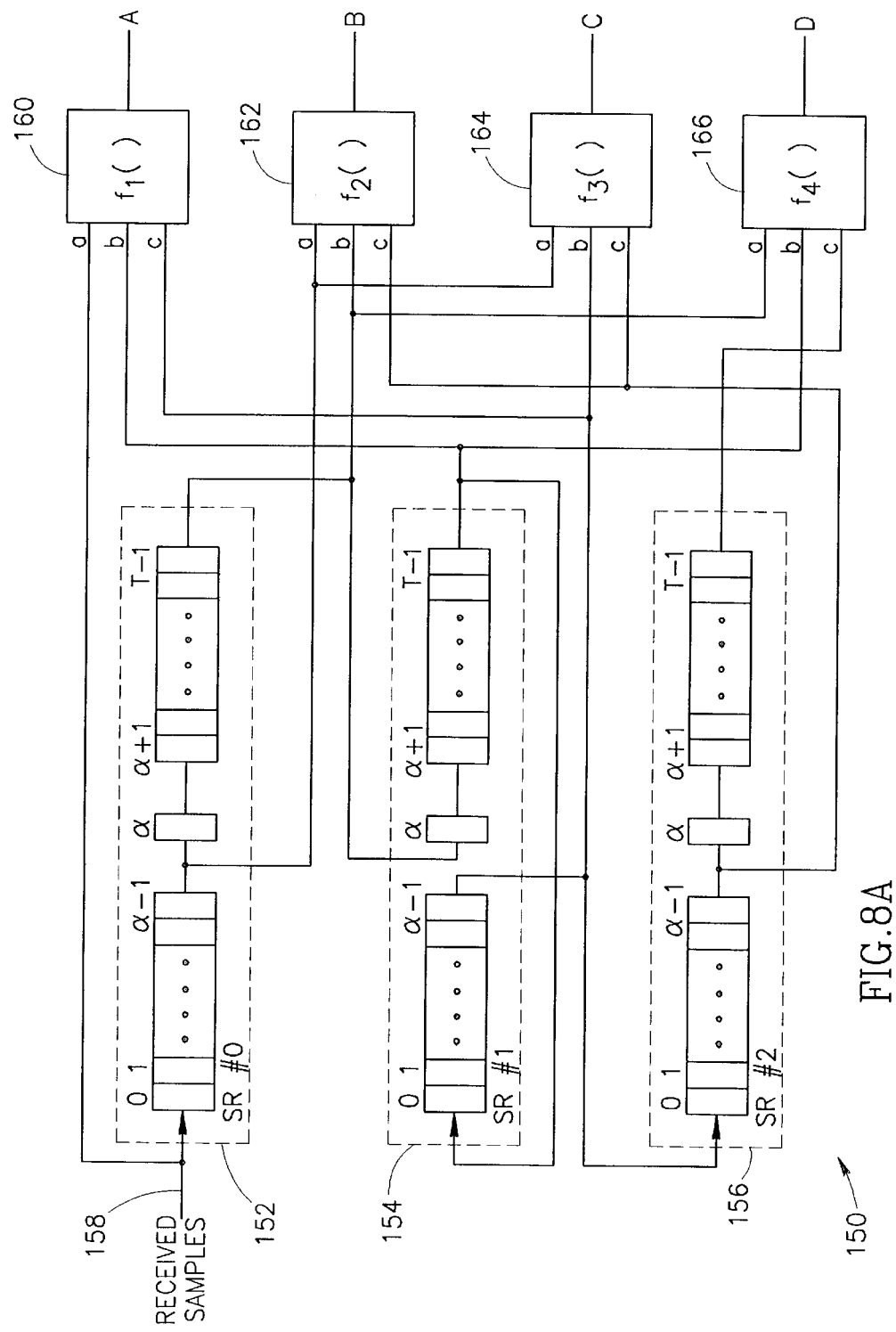
FIGS. 8A and 8B are a block diagram illustrating a fourth embodiment of the synchronization system of the present invention wherein the number of shift registers is equal to the number of symbols transmitted in the preamble.
Figure 8B:
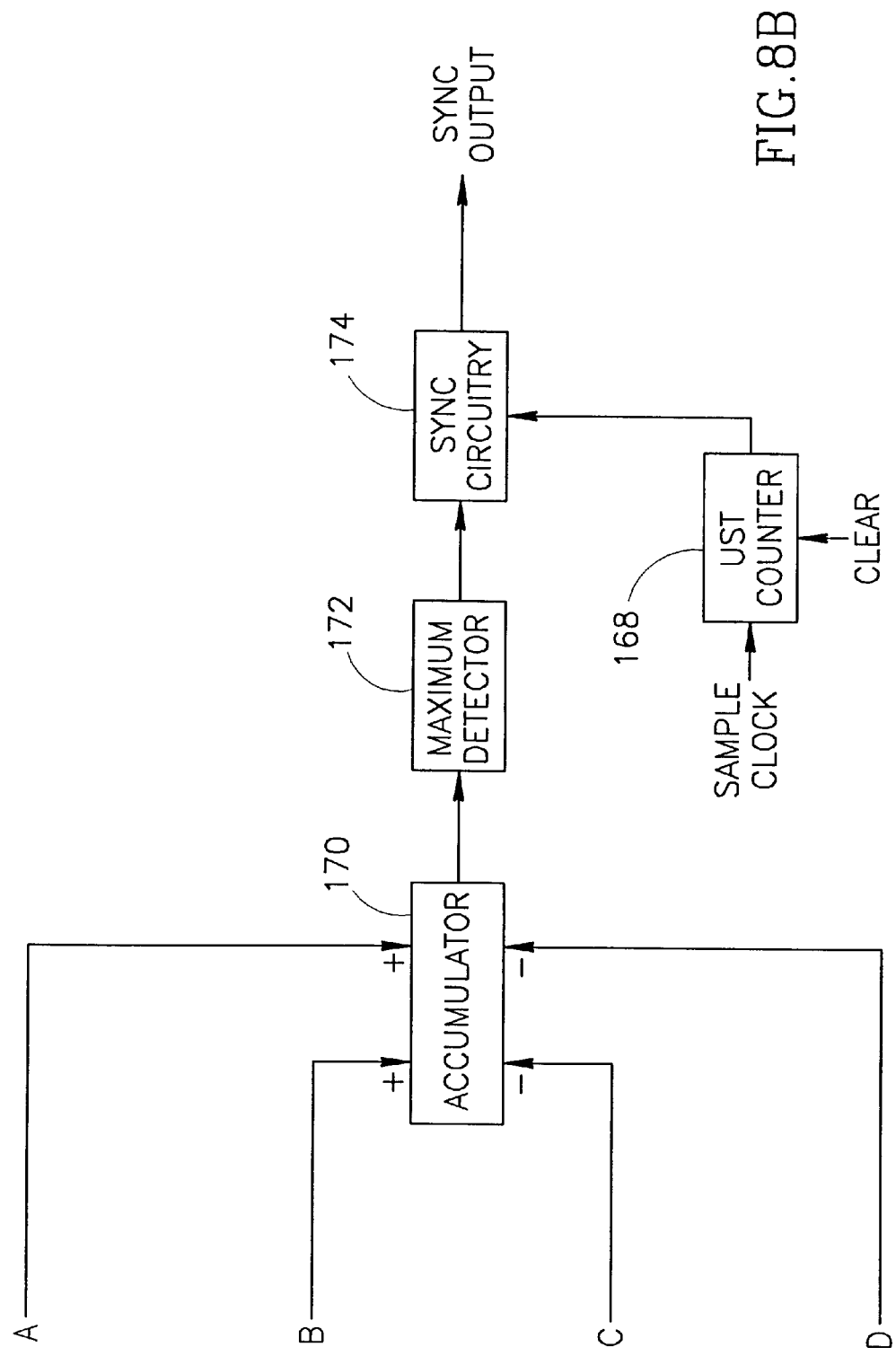

A block diagram illustrating a fourth embodiment of the synchronization system of the present invention wherein the number of shift registers is equal to the number of symbols transmitted in the preamble is shown in FIGS. 8A and 8B. The synchronization apparatus, generally referenced 150, comprises a plurality of shift registers 152, 154, 156, labeled SR #0, SR #I, SR#2, respectively, a plurality of function blocks 160, 162, 164, 166, representing functions $f_1(\ )$, $f_2(\ )$, $f_3(\ )$, $f_4(\ )$, respectively, an accumulator 170, maximum detector 172, synchronization circuitry 174 and UST counter 168.

The arrangement of the shift registers is made in accordance with the preamble sequence. Symbols with zero shift have corresponding shift registers whose input is the left most bit and whose output is the right most bit. Symbols with non-zero shifts have corresponding shift registers whose input is the tap corresponding to the particular rotation applied to that symbol.

In the example shown in FIGS. 8A and 8B, the preamble sequence comprises three symbols $S_0$, $S_\alpha$, $S_0$ representing a zero shift symbol, a shifted symbol followed by a zero shift symbol. The corresponding shift registers SR #0, SR#1, SR #2 are arranged as follows. The received data samples 158 are input to the serial input of SR #0. The serial output of SR #0 is input to the $\alpha$ tap of SR #1 while its serial output is wrapped around to its serial input. The output of the $\alpha$−1 tap is input to the serial input of SR #2. Note that in SR #1, the bits do bot circulate past the $\alpha$ tap. Bits clocked out of the $\alpha$−1 tap are clocked into the left most tap of SR #2. The serial output of SR #2 (right most tap) is not shifted further but is input to function $f_4(\ )$.

Each shift register has a length of T bits or taps where T in this example is equal to 64 taps. The receiver therefore contains a group of three shift registers serially connected to each other as shown in FIGS. 8A and 8B.

The various bits input to the functions 160, 162, 164, 166 comprise the bits taken from either the first (leftmost) bit, last (rightmost) bit, $\alpha$−1 tap or $\alpha$ tap. In particular, the inputs to function $f_1(\ )$ comprise the new incoming samples that are input to the leftmost tap of each of the three shift registers. All four functions 160, 162, 164, 166 comprise adding the three inputs and squaring the result as expressed below in Equation 11.

$$f_1 = f_2 = f_3 = f_4 = (a+b+c)^2 \tag{11}$$

Note that as an alternative, the functions may comprise other combinations of the inputs rather than the sum of the inputs squared. The advantage of the function of Equation 11 is that squaring the sum causes the extremes of the input values to be amplified. Preferably, however, the function comprises the sum of the inputs in some way, e.g., the average.

In particular, the inputs of function $f_1$ comprise the bit about to be right shifted into each shift register. Note that at any point in time, the bits input to function block $f_1$ 160 are the bits that would be the leftmost bits in each shift register on the occurrence of the next clock cycle. Thus, the inputs to function $f_1$ 160 comprise received sample data 158 input to SR #0, the serial output of SR #1 (which is fed back to the serial input) and the output of the $\alpha$−1 tap of SR #1 which is input to the serial iput of SR #2. All three inputs are summed and the resulting sum is squared. The result is then added to the accumulator 170.

Similarly, the inputs to function $f_2$ 162 comprise the samples that will be inserted into the $\alpha$ tap of each of the shift registers upon the occurrence of the next clock cycle. All three inputs are summed and the resulting sum is squared. In particular, the input comprises the output of the $\alpha-1$ tap of SR #0, the serial output of SR #0 (which is input to the $\alpha$ tap of SR #1), and the output of the $\alpha-1$ tap of SR #2. The result is then added to the accumulator 170.

In essence, the first two functions $f_1$ and $f_2$ represent the new received samples that are clocked into location 0 and $\alpha$ of each shift register, respectively. Function $f_1$ represents the bits in the first tap position of each shift register while function $f_2$ represents the bits in the $\alpha$ tap position. The second two functions $f_3$ and $f_4$ represent the old samples that are clocked out from location $\alpha-1$ and T-1 of each shift register, respectively. Function $f_3$ represents the bits that will be removed from the $\alpha-1$ tap in each shift register while function $f_4$ represents the right most tap.

The inputs to function $f_3$ 164 comprise the samples that are currently output from the $\alpha-1$ tap of each of the shift registers. All three inputs are summed and the resulting sum is squared. In particular, the input comprises the output of the $\alpha-1$ tap of SR #0, the output of the $\alpha-1$ tap of SR #1 and the output of the $\alpha-1$ tap of SR #2. The result is then subtracted from the accumulator 170.

The inputs to function $f_4$ 166 comprise the samples that are currently output from the right most tap of each shift register. All three inputs are summed and the resulting sum is squared. In particular, the input comprises the output of the right most tap of SR #0, the output of the right most tap of SR #1 and the output of the right most tap of SR #2. The result is then subtracted from the accumulator 170.

In operation, the preamble symbols are input to the shift registers. During each clock cycle, a receive sample is input to SR #0. In addition, the selected taps are input to the various functions whose outputs are input to the accumulator 170. Thus, for each new received sample input, it is added to the accumulator. Likewise, each time a sample is dropped, i.e., clocked out of the shift register, the sample is subtracted from the accumulator 170. In this fashion, a constant number of samples are maintained in the accumulator. It is as if a 'window' is established containing a constant number of samples. An expression for the accumulator is given below in Equation 12.

$$\text{accumulator=accumulator}+f_1+f_2-f_3-f_4 \qquad (12)$$

Each of the functions $f_1(\ )$, $f_2(\ )$, $f_3(\ )$, $f_4(\ )$ represents a different group of samples wherein the number of samples in each group equals the number of symbols in the preamble.

The accumulator is initialized to a negative number equal to the average output response to random noise. During the first UST no subtraction is performed since during this period, the new upcoming samples have not reached the end of the shift registers, i.e., the new bits have not yet begun to replace old bits. After one UST period has past SR #0 is full and all incoming samples shifted in cause bits to be shifted at each tap position resulting in the right most bit being discarded. Only at this point should a subtraction in the accumulator be made.

The output of the accumulator 170 is input to the maximum detector circuit 172. The maximum detector 172 functions to determine the maximum value of the output of the accumulator over a period of time. The maximum detector 172 is adapted to generate an output every sample time.

The output of the maximum correlation detector 172 is input to the synchronization circuitry 174. The synchronization circuitry 174 also receives the output of a UST counter 168. The UST counter is adapted to output a pulse after a UST time. It receives the sample clock as input in addition to a clear signal. The synchronization circuitry looks at the output of the maximum correlation detector and if a new maximum is detected, the UST counter 168 is cleared. Once a UST time has elapsed, a synchronization pulse is generated indicating that synchronization has been achieved. The synchronization pulse is generated exactly one UST from the detection of the last maximum. Note that the search for a maximum correlation is initiated only after a predefined threshold is exceeded.

When the preamble sequence is received at the receiver and input to the synchronization apparatus, the accumulator function output will increase gradually until a peak is obtained whereby it will gradually decrease. The graph illustrating the synchronization output signal as a result of the function blocks and accumulator function is similar to that shown in FIG. 7 and is not shown here. Using the example of FIGS. 8A and 8B, the peak would indicate results obtained in response to receipt of a preamble having three symbols with the middle symbol rotated.

The point when a peak was reached corresponds to the point when full synchronization was obtained. One UST time period after the peak a synchronization signal is generated. At the moment of full synchronization, it is preferably to save the contents of the shift registers for use as a template at a later time, i.e., tracking purposes, if adaptive CSK is used to receive the data.

As described previously, the synchronization apparatus 150 can be adapted to handle preamble sequences having any number of symbols comprising any combination of zero shifted and non-zero shifted symbols. The number of functions used in the apparatus will vary with the contents of the preamble sequence. More specifically, the number of functions required is related to the number of unique shifts in the preamble symbols. The number of functions added to and subtracted from the accumulator is equal to the number of unique shits in the preamble symbols. In the example shown in FIGS. 8A and 8B, there are only two unique shifts in the three symbols making up the preamble. Thus, the apparatus comprises two functions whose outputs are added to the accumulator and two functions whose outputs are subtracted from the accumulator.

As a further example, consider a preamble sequence having three symbols comprising $S_0$, $S_\alpha$, $S_\beta$, i.e., one zero shift symbol and two symbols shifted by $\alpha$ and $\beta$, respectively. In this case, six functions are used: three whose outputs are added to the accumulator and three whose outputs are subtracted from the accumulator.

In the case of five symbols $S_0$, $S_0$, $S_\alpha$, $S_\beta$, $S_0$ six functions are used: three whose outputs are added to the accumulator and three whose outputs are subtracted from the accumulator. Five shift registers, however, would be required.

As a further example, some of the symbols can be phase rotated or inverted in the transmitter. In the corresponding circuit at the receiver, the input to the functions would be appropriately phase rotated or inverted before summing and squaring.

Fifth Embodiment: Multiple Channels

The fifth embodiment of the present invention combines multiple synchronization circuits such as that described hereinabove to form two or more channels. The first four embodiments described previously represent synchronization circuits used for a single channel. If more than one channel is used in the receiver, the outputs of all the synchronization circuits are combined to generate a single synchronization output.

As described previously, a receiver may comprise several channels, each channel occupying a different frequency band. Further, each channel may comprise separate I and Q channels. The use of multiple channels aids in combating interference in any one particular frequency band. Each frequency may have separate I and Q streams.

Figure 9:
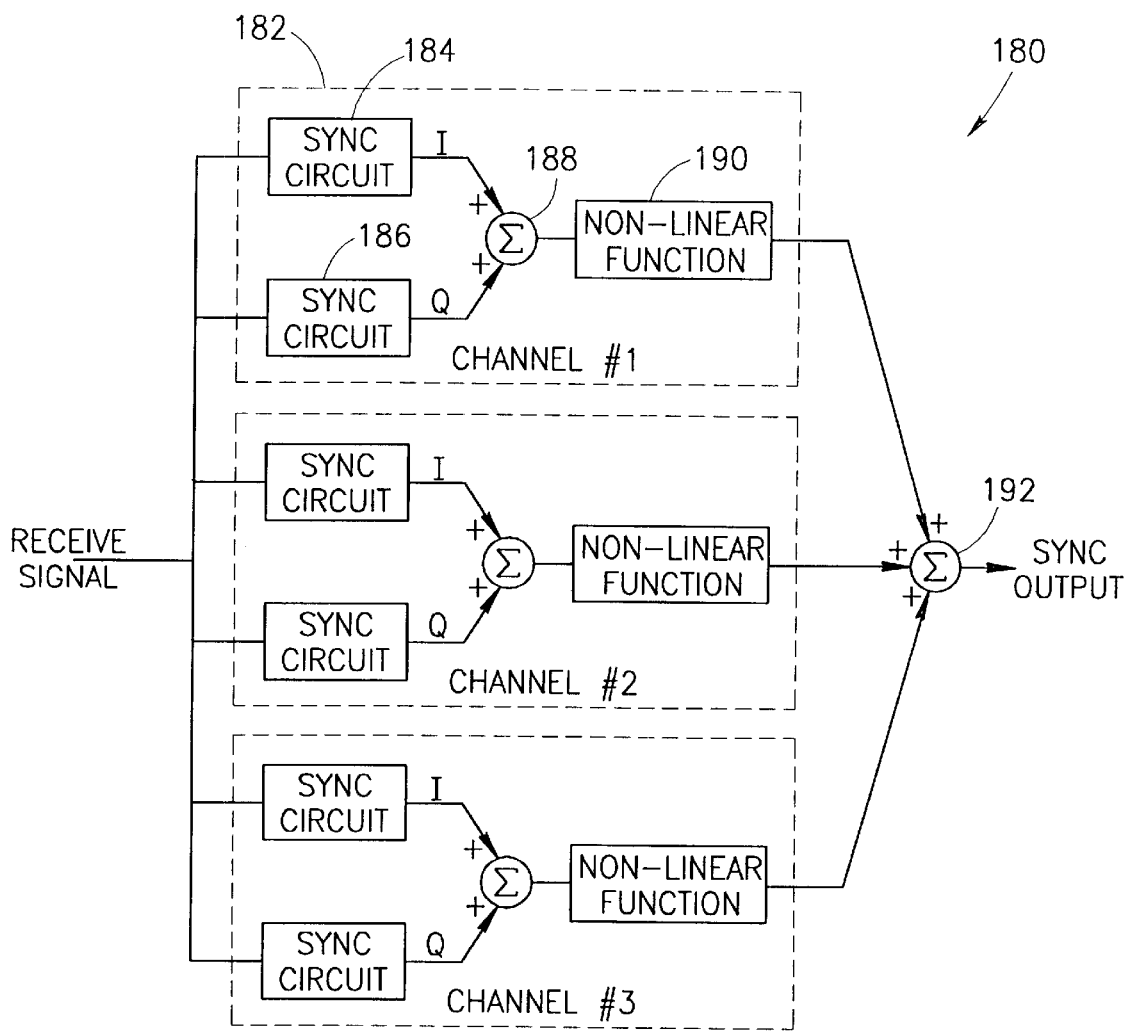
FIG. 9 is a block diagram illustrating a fifth embodiment wherein the output of multiple channels/combine to form the synchronization output, each channel utilizing a separate synchronization circuit.

A block diagram illustrating an example of a synchronization acquisition circuit for a receiver comprising multiple channels is shown in FIG. 9. The synchronization acquisition circuit, generally referenced 180, comprises three channels 182 labeled channel #1 through channel #3. Note that the receiver may comprise any number of channels, three channels being used here for illustration purposes only.

Each channel 182 comprises two synchronization circuits 184, 186 for the I and Q channels (if required). Alternatively, a single synchronization circuit may be used for each channel. The outputs of the synchronization circuits associated with the I and Q paths are input to a summer 188. The output of each summer is passed through a non-linear function 190. The non-linear function improves the performance of the acquisition process by enhancing the higher values and suppressing the lower values output of each synchronization circuit in a non-linear fashion before being summed. The outputs of the three non-linear functions are input to a another summer 192 and the results is used as the synchronization output.

Note that, in general, the output of the synchronization circuits is taken before the maximum correlation detector, i.e., after the correlator (FIGS. 2B and 5), after the summer 129 (FIG. 6), after the accumulator 170 (FIG. 8B).

Figure 10:
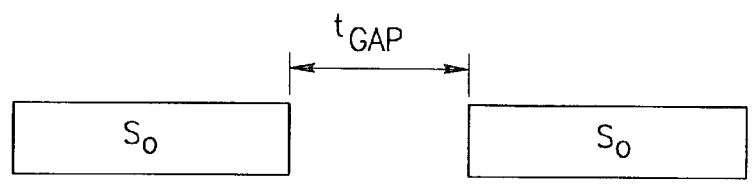
FIG. 10 is a diagram illustrating an alternative synchronization technique that varies the time delay between symbols transmitted.

In an alternative embodiment, the reliability achieved by sending one or more symbols with predefined rotation may be achieved by randomizing the time delay inserted between symbols. This is illustrated in FIG. 10 which shows two symbols with a predetermined time interval $t_{GAP}$ inserted between two symbols. In operation, the receiver would have knowledge of the expected time delay and can be adapted to detect the presence of a correct time delay between the symbols. Any number of symbols with gaps between them may be used, wherein a larger number of symbols provides increased reliability.

A plurality of vectors are formed from the received signal and de-shifted in time, i.e., time corrected, and phase corrected. The resulting vectors is applied to a matching function which outputs a synchronization signal indicative of the degree of synchronization.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. In a communications system, a method of acquiring synchronization, comprising the steps of:

transmitting a preamble over a communication channel, said preamble comprising a plurality of symbols having known rotation and phase;

receiving a sequence of input samples from said communication channel;

dividing said received sequence into two or more vectors;

de-rotating and phase correcting said vectors back to their original rotation and phase; and applying a matching function between said vectors so as to generate a metric indicative of the degree of synchronization.

2. The method according to claim 1, wherein said symbols comprise spreading waveforms characterized by high, sharp autocorrelation.

3. The method according to claim 1, wherein said symbols comprise pseudo noise sequences.

4. The method according to claim 1, wherein said step of applying a matching function utilizes a correlator to compare said one or more vectors and a template formed from some of the vectors in a recursive fashion.

5. The method according to claim 1, wherein said step of applying a matching function utilizes a correlator to compare said one or more vectors and a template formed from some of the vectors in a non-recursive fashion.

6. In a communications system, a method of acquiring synchronization, comprising the steps of:

transmitting a preamble over a communication channel, said preamble comprising a plurality of symbols having known rotation and phase;

receiving a sequence of input samples from said communication channel over a plurality of channels, each channel corresponding to a different frequency band;

dividing said received sequence into two or more vectors within each channel;

de-rotating and phase correcting said vectors back to their original rotation and phase;

applying a matching function between said vectors so as to generate a metric for each channel indicative of the degree of synchronization; and combining the metric generated for each said channel so as to produce a combined output metric indicative of the degree of synchronization for all channels.

7. The method according to claim 6, wherein said step of combining comprises generating said combined output metric utilizing a single synchronization circuit.

8. The method according to claim 6, wherein said step of combining comprises generating said combined output metric utilizing separate synchronization circuits, each synchronization circuit associated with a single channel, wherein the output of one of said synchronization circuits is selected according to a predetermined criterion.

9. The method according to claim 6, wherein said step of combining comprises the steps of:

passing the output of each channel through a nonlinear function; and summing the outputs of the nonlinear function for each channel.

10. The method according to claim 6, further comprising the step of dividing each channel into separate I and Q channels.

11. The method according to claim 6, wherein said symbols comprise spreading waveforms characterized by high, sharp autocorrelation.

12. In a communications system, a method of acquiring synchronization, comprising the steps of:

transmitting a preamble comprising a plurality of symbols having a first rotation and phase followed by one or more rotated symbols each having a predefined rotation and phase, said preamble transmitted over a communications channel;

generating a template adapted in accordance with the contents of said plurality of symbols during the reception thereof;

generating vectors from a signal received from said communications channel, said vectors generated in accordance with said rotated symbols;

de-rotating and phase correcting said vectors back to their original rotation and phase; and matching said vectors with said template so as to generate a metric indicative of the degree of synchronization.

13. The method according to claim 12, wherein the step of generating vectors comprises the step of inputting said received signal into a shift register at a tap position a distance from the first tap corresponding to the amount of a second rotation.

14. The method according to claim 12, wherein the step of matching said vectors comprises the step of correlating the contents of said template with the contents of a shift register so as to generate a correlation sum, and detecting synchronization in response to a maximum correlation sum.

15. The method according to claim 12, wherein the amount of said first rotation is equal to zero.

16. The method according to claim 12, wherein the amount of said first rotation is equal to a fixed value wherein each symbol in said plurality of symbols is rotated similarly.

17. The method according to claim 12, wherein the template comprises a plurality of shift registers corresponding to the number of symbols in said preamble.

18. The method according to claim 12, wherein the template comprises a plurality of shift registers independent of the number of symbols in said preamble.

19. The method according to claim 12, wherein said step of generating a template comprises adapting the template as a function of the previous contents of said template and the received signal.

20. The method according to claim 12, wherein said step of generating a template comprises adapting the template as a function of said symbols de-rotated.

21. The method according to claim 12, wherein said step of generating a template comprises adapting the template as a function of said symbols phase corrected.

22. An apparatus for acquiring synchronization in a communications system, the communications system including a preamble consisting of a plurality of symbols having a first rotation followed by a shifted symbol having a second rotation, said preamble transmitted over a communications channel, said apparatus comprising:

a template including means for adapting said template to the characteristics of said communication channel during the reception of said plurality of symbols;

a shift register adapted to input a received signal at a tap position a distance from the first tap corresponding to the amount of said second rotation; and a correlator operative to correlate the contents of said template with the contents of said shift register so as to generate a correlation sum, synchronization being detected in response to a maximum correlation sum.

23. The apparatus according to claim 22, wherein the amount of said first rotation is equal to zero.

24. The apparatus according to claim 22, wherein the amount of said first rotation is equal to a fixed value wherein each symbol in said plurality of symbols is rotated similarly.

25. The apparatus according to claim 22, wherein said template comprises a plurality of shift registers corresponding to the number of symbols in said preamble.

26. The apparatus according to claim 22, wherein said template comprises a plurality of shift registers independent of the number of symbols in said preamble.

27. The apparatus according to claim 22, wherein said means for adapting said template comprises means for adapting the template as a function of the previous contents of said template and the received signal.

28. The apparatus according to claim 22, wherein said function comprises an averaging function.

29. The apparatus according to claim 22, further comprising a maximum correlation detector adapted to find a maximum correlation sum.

30. The apparatus according to claim 22, further comprising a synchronization circuit adapted to generate a synchronization output signal in response to a maximum correlation sum.

31. The apparatus according to claim 22, wherein each symbol in said plurality of symbols may be phase rotated or phase inverted.

32. In a communications system, a method of acquiring synchronization, comprising the steps of:

transmitting a preamble comprising a plurality of symbols having a first rotation followed by M shifted symbols, wherein each shifted symbol is shifted by an amount independent of the shifts of other symbols, said preamble transmitted over a communications channel;

generating a template that is adapted to the characteristics of said communication channel during the reception of said plurality of symbols;

inputting a received signal into an $I^{th}$ shift register at a tap position a distance from the first tap corresponding to the amount of rotation of the $I^{th}$ shifted symbol;

correlating the contents of said template with the contents of said M shift registers so as to generate a plurality of correlations; and summing said plurality of correlations to generate a correlation sum and detecting synchronization in response to a maximum correlation sum.

33. An apparatus for acquiring synchronization in a communications system, the communications system including a preamble consisting of a plurality of symbols having a first rotation followed by M shifted symbols, wherein each shifted symbol is shifted by an amount independent of the shifts of other symbols, said preamble transmitted over a communications channel, said apparatus comprising:

a template including means for adapting said template to the characteristics of said communication channel during the reception of said plurality of symbols;

M shift registers, the $I^{th}$ shift register adapted to input a received signal at a tap position a distance from the first tap corresponding to the amount of rotation of the $I^{th}$ shifted symbol;

M correlators operative to correlate the contents of said template with the contents of said M shift registers so as to generate M correlation outputs; and a summer for summing said M correlation outputs so as to generate a correlation sum, synchronization being detected in response to a maximum correlation sum.

34. An apparatus for acquiring synchronization in a communication system, the communication system including a preamble sequence consisting of a plurality of symbols wherein each symbol has either a zero shift or a non-zero shift rotation associated therewith, said apparatus comprising:

N shift registers wherein N is equal to the number of symbols in said preamble sequence;

a first set of M functions wherein each function comprises N inputs, one input from each shift register, said first set of M functions for processing samples input to the left most tap of said N shift registers and for processing samples input to the tap position corresponding to those symbols having non-zero shift rotations;

a second set of M functions wherein each function comprises N inputs, one input from each shift register, said second set of M functions for processing samples output from the right most tap of said N shift registers and for processing samples output from tap positions one before the tap positions corresponding to those symbols having non-zero shift rotations;

an accumulator coupled to the output of each said function in said first set of M functions and said second set of M functions, wherein said output of said first set of M functions is added to said accumulator and the output of said second set of M functions is subtracted from said accumulator; and maximum detector circuitry operative to declare synchronization in response to a maximum peak output of said accumulator during a symbol time period.

35. The apparatus according to claim 34, wherein each said function comprises summing all N inputs and squaring the result.

36. The apparatus according to claim 34, further comprising means for phase correcting said symbols in accordance with a phase rotation or phase inversion $d_j$ previously applied to said symbols in said preamble.

37. In a communication system including a preamble sequence consisting of a plurality of symbols wherein each symbol has either a zero shift or a non-zero shift rotation associated therewith, a method of acquiring synchronization, said method comprising the steps of:

transmitting a preamble comprising a plurality of symbols, each symbol having either a zero rotation shift or a non-zero rotation shift, wherein each non-zero shifted symbol is shifted by an amount independent of the shifts of other symbols, said preamble transmitted over a communications channel;

inputting a received signal into a set of N shift registers where N is equal to the number of symbols in said preamble sequence;

processing selected taps of said N shift registers via a first set of M functions wherein each function comprises N inputs, one input from each shift register, said first set of M functions for processing samples input to the left most tap of said N shift registers and for processing samples input to the tap position corresponding to those symbols having non-zero shift rotations;

processing selected taps of said N shift registers via a second set of M functions wherein each function comprises N inputs, one input from each shift register, said second set of M functions for processing samples output from the right most tap of said N shift registers and for processing samples output from the tap positions one before the tap positions corresponding to those symbols having non-zero shift rotations;

accumulating an accumulator value by adding the output of said first set of M functions to said accumulator value and subtracting the output of said second set of M functions from said accumulator value; and declaring synchronization in response to the occurrence of a maximum peak of said accumulator value during a symbol time period.

38. The method according to claim 37, wherein each said function comprises summing all N inputs and squaring the result.

39. The apparatus according to claim 37, further comprising means for phase correcting said symbols in accordance with a phase rotation or phase inversion $d_j$ previously applied to said symbols in said preamble.

40. In a communications system, a method of acquiring synchronization, comprising the steps of:

transmitting a preamble over a communication channel, said preamble comprising a plurality of symbols having known time shift and phase;

receiving a sequence of input samples from said communication channel;

dividing said received sequence into two or more vectors;

correcting said vectors in time and phase back to their original time shift and phase; and applying a matching function between said vectors so as to generate a metric indicative of the degree of synchronization.

41. In a communications system, a method of acquiring synchronization, comprising the steps of:

transmitting a preamble over a communication channel, said preamble comprising a plurality of symbols having known rotation, time shift and phase;

receiving a sequence of input samples from said communication channel;

dividing said received sequence into two or more vectors;

de-rotating, de-shifting and phase correcting said vectors back to their original rotation, time shift and phase; and applying a matching function between said vectors so as to generyate a metric indicative of the degree of synchronization.

* * * * *